(12) United States Patent
Yokoyama et al.

(10) Patent No.: US 11,649,742 B2
(45) Date of Patent: May 16, 2023

(54) ATTACHMENT STRUCTURE FOR VEHICLE MOTOR, IN-VEHICLE EQUIPMENT, AND BRUSHLESS MOTOR

(71) Applicant: DENSO CORPORATION, Kariya (JP)

(72) Inventors: Seiya Yokoyama, Kariya (JP); Takahiro Tsuchiya, Kariya (JP); Shigemasa Kato, Kariya (JP); Yoji Yamada, Kariya (JP); Koji Mikami, Kariya (JP); Akihisa Hattori, Kariya (JP)

(73) Assignee: DENSO CORPORATION, Kariya (JP)

( * ) Notice: Subject to any disclaimer, the term of this patent is extended or adjusted under 35 U.S.C. 154(b) by 655 days.

(21) Appl. No.: 16/332,295

(22) PCT Filed: Oct. 30, 2017

(86) PCT No.: PCT/JP2017/039098
§ 371 (c)(1),
(2) Date: Mar. 11, 2019

(87) PCT Pub. No.: WO2018/084108
PCT Pub. Date: May 11, 2018

(65) Prior Publication Data
US 2019/0234251 A1    Aug. 1, 2019

(30) Foreign Application Priority Data

Nov. 7, 2016  (JP) .............................. JP2016-217248
Nov. 7, 2016  (JP) .............................. JP2016-217249
Oct. 4, 2017  (JP) .............................. JP2017-194384

(51) Int. Cl.
*F01L 1/352* (2006.01)
*F16D 65/18* (2006.01)
(Continued)

(52) U.S. Cl.
CPC ............ *F01L 1/352* (2013.01); *B60T 13/741* (2013.01); *B60T 13/748* (2013.01); *F01P 3/20* (2013.01);
(Continued)

(58) Field of Classification Search
CPC . F01L 1/352; F01L 1/748; F01L 1/344; F01L 2810/04; F01L 2810/03;
(Continued)

(56) References Cited

U.S. PATENT DOCUMENTS 5,719,459 A * 2/1998 Hasegawa ............ B62D 5/0409
310/78
2007/0089696 A1 * 4/2007 Moriya ................... F01L 1/344
123/90.15
(Continued)

FOREIGN PATENT DOCUMENTS

JP   H07-264822 A   10/1995
JP   2007-113537 A   5/2007
(Continued)

OTHER PUBLICATIONS

Jan. 30, 2018 International Search Report issued in International Patent Application No. PCT/JP2017/039098.

*Primary Examiner* — Thomas J Williams
*Assistant Examiner* — San M Aung
(74) *Attorney, Agent, or Firm* — Oliff PLC

(57) ABSTRACT

An attachment structure for a vehicle motor is applied for the purpose of attaching a vehicle motor to in-vehicle equipment. The attachment structure for a vehicle motor is provided with an axial gap motor that includes a rotor and a stator facing each other in the axial direction. The motor is attached to the in-vehicle equipment in a mode in which the axial direction is perpendicular to the vertical direction.

14 Claims, 16 Drawing Sheets

(51) Int. Cl.
| | |
|---|---|
| *H02K 1/2793* | (2022.01) |
| *H02K 21/24* | (2006.01) |
| *H02K 5/24* | (2006.01) |
| *H02K 7/14* | (2006.01) |
| *F01P 3/20* | (2006.01) |
| *B60T 13/74* | (2006.01) |
| *H02K 7/08* | (2006.01) |
| *H02K 29/03* | (2006.01) |
| *H02K 3/28* | (2006.01) |
| *H02K 5/173* | (2006.01) |
| *F01P 5/04* | (2006.01) |
| *F01P 5/12* | (2006.01) |
| *F02D 13/02* | (2006.01) |
| *F16D 121/20* | (2012.01) |

(52) U.S. Cl.
CPC ......... *F16D 65/186* (2013.01); *H02K 1/2793* (2013.01); *H02K 3/28* (2013.01); *H02K 5/24* (2013.01); *H02K 7/083* (2013.01); *H02K 7/14* (2013.01); *H02K 21/24* (2013.01); *H02K 29/03* (2013.01); *F01L 2001/3522* (2013.01); *F01L 2301/00* (2020.05); *F01L 2810/03* (2013.01); *F01L 2810/04* (2013.01); *F01L 2820/01* (2013.01); *F01L 2820/02* (2013.01); *F01L 2820/032* (2013.01); *F01L 2820/04* (2013.01); *F01P 2005/046* (2013.01); *F01P 2005/125* (2013.01); *F02D 13/0219* (2013.01); *F16D 2121/20* (2013.01); *H02K 5/1732* (2013.01); *H02K 2213/03* (2013.01)

(58) Field of Classification Search
CPC ............... F01L 2820/01; F01L 2820/04; F01L 2820/032; F01L 2820/02; F01L 2001/3522; F01L 2301/00; F01P 3/20; F01P 2005/125; F01P 2005/046; F16D 65/186; F16D 2121/20; F02D 13/0219

USPC ........................................................ 188/158
See application file for complete search history.

(56) References Cited

U.S. PATENT DOCUMENTS

| | | | | |
|---|---|---|---|---|
| 2008/0215225 | A1* | 9/2008 | Nakamura | F02P 5/1506 73/114.26 |
| 2009/0133955 | A1* | 5/2009 | Morikawa | H02K 11/33 180/444 |
| 2009/0230811 | A1* | 9/2009 | Asano | H02K 21/24 310/216.001 |
| 2010/0026216 | A1 | 2/2010 | Atarashi | |
| 2014/0054998 | A1* | 2/2014 | Kim | H02K 1/2753 310/156.07 |
| 2014/0230763 | A1* | 8/2014 | Watanabe | H05K 7/20845 123/90.15 |
| 2016/0204728 | A1* | 7/2016 | Notohara | B60L 7/14 310/198 |

FOREIGN PATENT DOCUMENTS

| | | |
|---|---|---|
| JP | 2008-160964 A | 7/2008 |
| JP | 2008-163904 A | 7/2008 |
| JP | 2008-211892 A | 9/2008 |
| JP | 2009-299566 A | 12/2009 |
| JP | 2011-024291 A | 2/2011 |
| JP | 2011-083056 A | 4/2011 |
| JP | 2012-239315 A | 12/2012 |
| JP | 2013-135541 A | 7/2013 |
| JP | 2014-155373 A | 8/2014 |
| JP | 2016-131444 A | 7/2016 |
| WO | 2015022803 A2 | 2/2015 |
| WO | 2016/111328 A1 | 7/2016 |

\* cited by examiner

ATTACHMENT STRUCTURE FOR VEHICLE MOTOR, IN-VEHICLE EQUIPMENT, AND BRUSHLESS MOTOR

TECHNICAL FIELD

The present invention relates to a motor attachment structure provided in an in-vehicle device.

BACKGROUND ART

In the prior art, various in-vehicle devices including a motor serving as a drive source are mounted on a vehicle. For example, patent document 1 discloses a variable valve timing device as an example of an in-vehicle device that adjusts a relative phase of a camshaft and a crankshaft, which determines an opening/closing timing of an intake valve or an exhaust valve of an internal combustion engine, based on a driving force of a motor.

Further for example, as described in, for example, patent document 2, in the prior art, a brushless motor for a vehicle includes, a stator including coils, a rotor opposing the stator, and a drive circuit connected to the coils of the stator. When current is supplied from the drive circuit to the coil of the stator and a rotating magnetic field is generated at the coils of the stator, the rotor is rotationally driven by the rotating magnetic field.

PRIOR ART DOCUMENTS

Patent Documents

Patent Document 1: Japanese Laid-Open Patent Publication No. 2008-160964
Patent Document 2: Japanese Laid-Open Patent Publication No. 7-264822

SUMMARY OF INVENTION

Problems that are to be Solved by the Invention

In the in-vehicle device described in Patent document 1, the output side of the motor is often fixed to a main body of the in-vehicle device in a state in which a side opposite to the output side of the motor projecting from the main body of the in-vehicle device. Thus, the motor has a tendency to be vibrated by the vibration produced when the vehicle travels or by the vibration of the in-vehicle device. As a result, the vibration generates noise, lowers the performance, and causes structural deterioration.

In the brushless motor described in patent document 2, there is a need to obtain redundancy. The brushless motor of the above-described document improves redundancy by using two sets of the coil and the drive circuit. However, the coils of two sets are wound around each tooth. Thus, when the coil of one of the sets is heated such that the coating of the coil is melted or carbonized, the heat will easily affect the coil of the other set. In this regard, there is still room for improvement.

It is an object of the invention to provide a vehicle motor attachment structure and an in-vehicle device capable of reducing vibration of a motor.

Means for Solving the Problems

To achieve the above object, a vehicle motor attachment structure is applied to attach a vehicle motor to an in-vehicle device. The vehicle motor attachment structure includes an axial gap type motor including a rotor and a stator opposing each other in an axial direction. The motor is attached to the in-vehicle device so that the axial direction is perpendicular to a vertical direction.

DESCRIPTION OF EMBODIMENTS

First Embodiment

Figure 2:
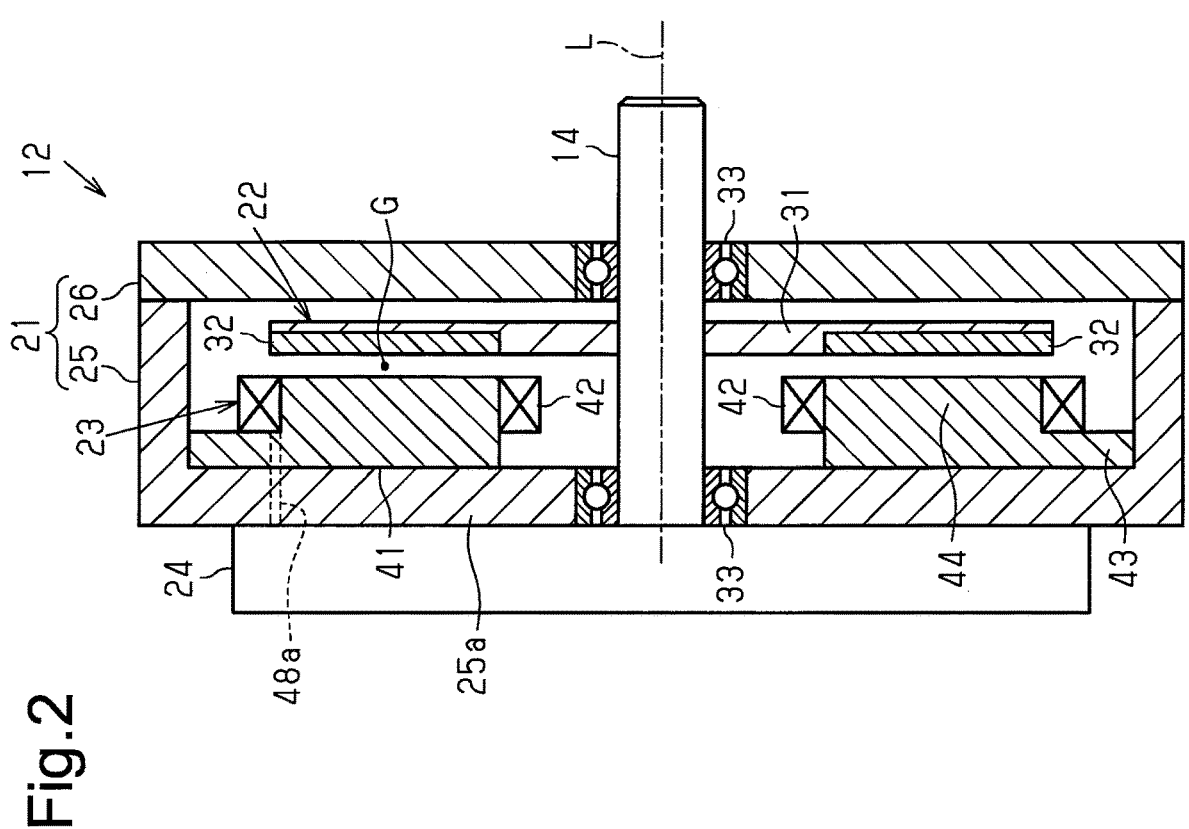
FIG. 2 is a cross-sectional view of a motor of FIG. 1.

Hereinafter, a first embodiment of a vehicle motor attachment structure and an in-vehicle device will be described. In the present embodiment, a variable valve timing device of an internal combustion engine will be described as an example of the in-vehicle device. In the drawings, elements are illustrated for simplicity and clarity and have not necessarily been drawn to scale.

Figure 1:
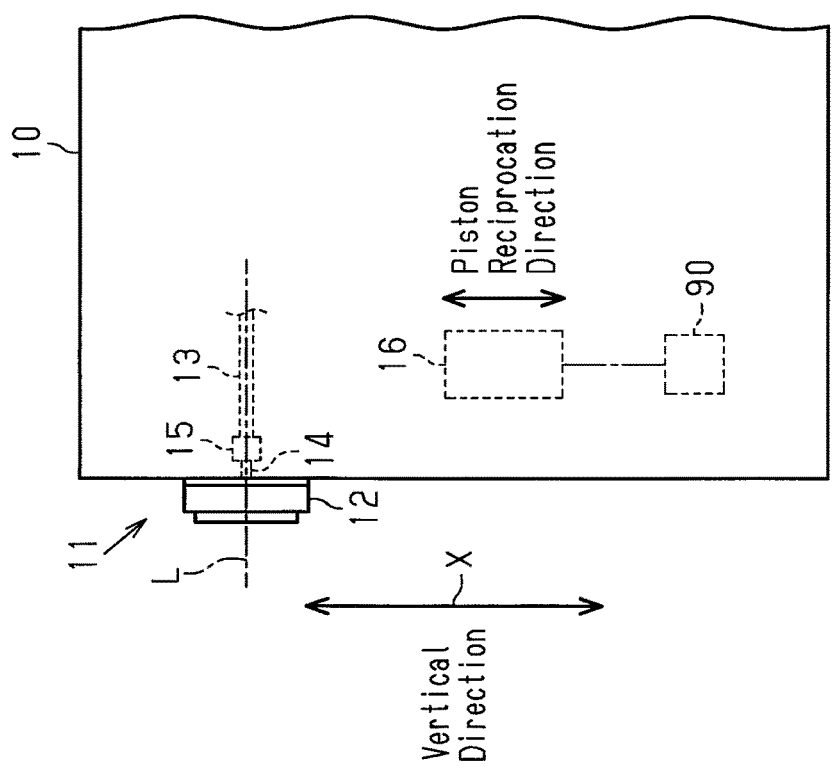
FIG. 1 is a schematic view showing a variable valve timing device according to a first embodiment.

As shown in FIG. 1, a variable valve timing device 11, which is mounted on an internal combustion engine 10 of a vehicle, includes a motor 12 and is used to adjust a relative rotation phase of a camshaft 13 with respect to a crankshaft (not shown) in the internal combustion engine 10 based on the driving of the motor 12. More specifically, a rotation shaft 14 of the motor 12 is connected to the camshaft 13 for opening or closing an engine valve (not shown) through an adjustment mechanism 15. Then, the adjustment mechanism 15, which is operated by the rotation torque output from the motor 12, is used to adjust an engine valve opening/closing timing by operating the camshaft 13.

In a state in which the internal combustion engine 10 is mounted on the vehicle, the motor 12 is attached to the internal combustion engine 10 so that the direction of the axis L of the rotation shaft 14 (hereinafter, simply referred to as the axial direction of the motor 12 or the axial direction) is perpendicular to a vertical direction X (the up-down direction of the vehicle). In other words, in a state in which the internal combustion engine 10 is mounted on the vehicle, the axial direction of the motor 12 is parallel to the horizontal direction. Further, the axial direction of the motor 12 is also perpendicular to the reciprocation direction of the piston 16 of the internal combustion engine 10. Further, the axial direction of the motor 12 is also perpendicular to the front-rear direction of the vehicle (in a direction perpendicular to plane of FIG. 1). That is, the axial direction of the motor 12 is parallel to the vehicle width direction.

As shown in FIG. 2, the motor 12 includes a motor casing 21, a rotor 22 and a stator 23 which are accommodated in the motor casing 21, and a drive circuit 24 which is electrically connected to the stator 23. The motor 12 is an axial gap type brushless motor configured so that the rotor 22 and the stator 23 are opposed to each other in the axial direction, that is, an air gap G is provided between the rotor 22 and the stator 23 in the axial direction.

The motor casing 21 includes a yoke housing 25, which is cylindrical and has a closed end, and an end frame 26, which is fixed to the yoke housing 25 so as to close the open end of the yoke housing 25. Furthermore, in the present embodiment, the rotation shaft 14 of the rotor 22 projects outward from the end frame 26 and the projection portion serves as an output portion connected to the adjustment mechanism 15. That is, the end frame 26 forms an output side of the motor casing 21. Then, the motor casing 21 is fixed to the housing so that the end frame 26 is in contact with the housing of the variable valve timing device 11 (the housing of the internal combustion engine 10) (refer to FIG. 1).

Figure 3:
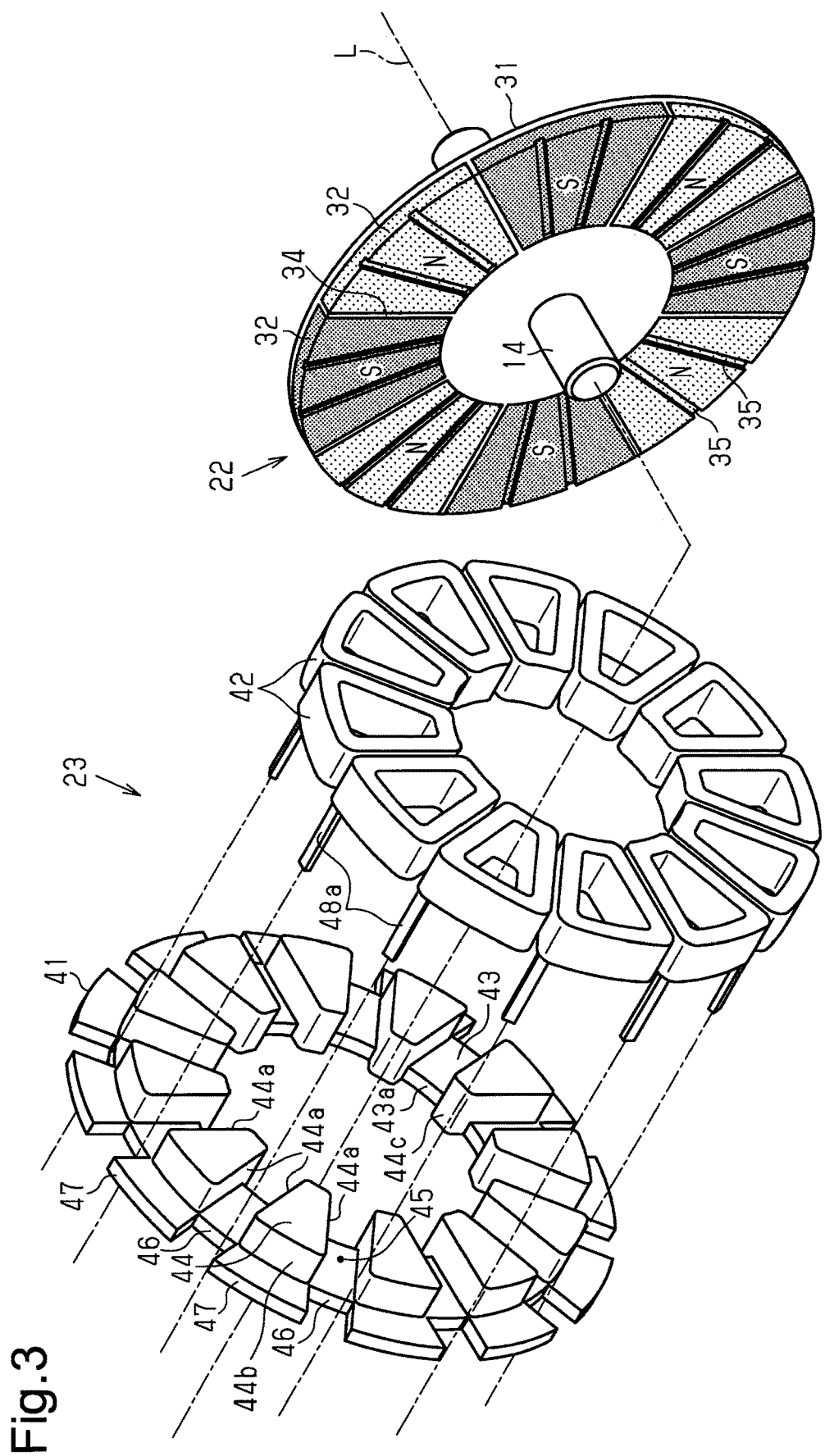
FIG. 3 is an exploded perspective view of a rotor and a stator of FIG. 2.

As shown in FIGS. 2 and 3, the rotor 22 includes a disc-shaped rotor core 31, in which the rotation shaft 14 is connected to a center portion, and a plurality of magnets 32, which are provided on one end surface of the rotor core 31 in the axial direction. The rotation shaft 14 of the rotor 22 is rotatably supported by a bearing 33 provided on each of the yoke housing 25 and the end frame 26. The rotor core 31 is arranged perpendicular to the rotation shaft 14. Further, the rotor core 31 and the rotation shaft 14 are fixed to each other so as to be integrally rotatable.

The magnets 32 of the rotor 22 are provided on an end surface near the stator 23 in the rotor core 31 in the axial direction to be arranged side by side in the circumferential direction. A surface opposing the stator 23 in each magnet 32 (an end surface near the stator 23 in the axial direction) is formed in a plane shape to be perpendicular to the axis L of the rotation shaft 14. Each magnet 32 is magnetized in the axial direction so that a magnetic pole is formed on the axial end surface of each magnet 32. In the present embodiment, eight magnets 32 are provided in the rotor 22. A magnet 32 in which a magnetic pole is formed on a surface opposing the stator 23 is an N pole and a magnet 32 in which a magnetic pole formed on a surface opposing the stator 23 is an S pole are alternately arranged at equal intervals in the circumferential direction. That is, the rotor 22 includes eight poles. Furthermore, the number of magnetic poles of the rotor 22 of the present embodiment is 2m×n (m and n are natural numbers). In the present embodiment, the number of magnetic poles of the rotor 22 is "8" because m is 2 and n is 4.

Figure 4:
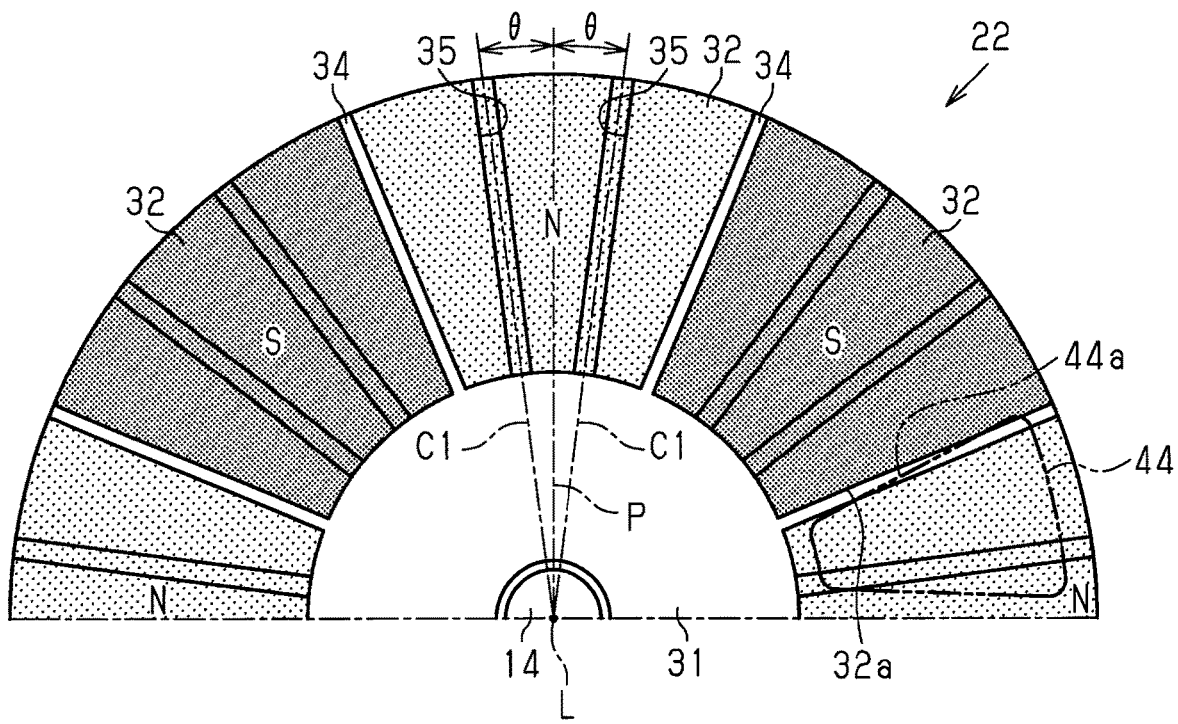
FIG. 4 is a plan view showing part of the rotor of FIG. 3.

As shown in FIG. 4, each magnet 32 is sectoral as viewed in the axial direction. Further, the magnets 32 are located at intervals in the circumferential direction. A portion between the magnets 32 adjacent to each other in the circumferential direction (inter-magnet portion 34) is uniform in the radial direction. That is, the portion has a constant width. Further, the circumferential center line of each inter-magnet portion 34 is formed to intersect the axis L of the rotation shaft 14.

A pair of grooves 35 is formed to be recessed in an end surface near the stator 23 in each magnet 32 in the axial direction (a surface opposing the stator 23). Each groove 35 extends linearly in the radial direction from the radially inner end portion to the radially outer end portion of the magnet 32. Specifically, a circumferential center line C1 of the groove 35 is formed to intersect the axis L of the rotation shaft 14, and the groove 35 is linear so as to have a constant width along the circumferential center line C1.

Next, the formation positions of the pair of grooves 35 will be described.

The pair of grooves 35 of the magnet 32 is provided so that the circumferential center lines C1 of the pair of grooves 35 are separated by the same angle (angle θ) in the clockwise direction and the counterclockwise direction from the magnetic pole center line P of the magnet 32 (the circumferential center line of the magnet 32). That is, the pair of grooves 35 is provided at line symmetrical positions with respect to the magnetic pole center line P of the magnet 32.

Further, the formation positions of the pair of grooves 35 based on the magnetic pole center line P (the angle θ) are determined by the following equation based on the cycle (the angle φ) of the cogging torque.

$$\theta = (\tfrac{1}{2} + n) \cdot \varphi$$

Here, n is an integer. In the present embodiment, n is 0.

In general, the cycle φ of the cogging torque is a value obtained by dividing 360° by the least common multiple of the number of magnetic poles of the rotor 22 and the number of teeth 44 (to be described later) (the number of slots) of the stator 23. That is, in the present embodiment, since the number of magnetic poles of the rotor 22 is eight and the number of teeth 44 is twelve, the least common multiple is twenty-four. That is, the cycle φ of the cogging torque is 15 (=360/24°). Thus, the angle φ is 7.5 (=15/2°), that is, one-half of the cycle φ of the cogging torque. Further, an angle formed by the circumferential center lines C1 of the pair of grooves 35 based on the axis L of the rotation shaft 14 is the same as the cycle φ (=15°) of the cogging torque.

Furthermore, it is desirable to form the magnet 32 as a bonded magnet (a plastic magnet or a rubber magnet) in consideration of the ease of the formation of the groove 35, but the magnet can be also formed as, for example, a sintered magnet or the like other than the bonded magnet. When the magnet 32 is formed as the bonded magnet, for example, a rare earth magnet such as a samarium iron nitrogen (SmFeN) based magnet, a samarium cobalt (SmCo) based magnet, and a neodymium magnet is desirable. Further, when the magnet 32 is formed as the sintered magnet, for example, a ferrite magnet, a samarium cobalt (SmCo) magnet, a neodymium magnet, or the like is desirable.

As shown in FIGS. 2 and 3, the stator 23 includes an annular stator core 41 which is supported by the motor casing 21, and a plurality of coils 42, which are wound around the stator core 41. Furthermore, in the present embodiment, the stator core 41 is fixed to the inside of the yoke housing 25 in the motor casing 21.

The stator core 41 is a powder magnetic core formed by press-molding a magnetic powder. The stator core 41 includes a ring-shaped base portion 43, which functions as a back yoke, and twelve teeth 44, which project in the axial direction from the base portion 43 toward the rotor 22. The base portion 43 is fixed to an inner surface of a bottom portion 25a of the yoke housing 25.

Twelve teeth 44 are provided at equal angular intervals (in the present embodiment, intervals of 30°) in the circumferential direction. Each tooth 44 is substantially sectoral, as viewed in the axial direction, and cylindrical so as to project to a predetermined height in the axial direction. The twelve teeth 44 are identical in construction. An axial front end surface of each tooth 44 (an end surface near the rotor 22 in the axial direction) is flat and perpendicular to the axis L of the rotation shaft 14, and the axial front end surface opposes the magnet 32 of the rotor 22 in the axial direction with the air gap G located in between. Further, the teeth 44 which are adjacent to each other in the circumferential direction, are separated from each other in the circumferential direction, and the gap serves as a slot 45 through which the coil 42 passes. Each of the slots 45 has a constant width in the radial direction. That is, circumferential side surfaces 44a of the pair of teeth 44 opposing each other in the circumferential direction are parallel to each other.

As shown in FIG. 3, the outer diameter of the base portion 43 is set to be larger than the diameter of outer end portions 44b of the teeth 44 in the radial direction. In addition, a plurality of notches 46 are provided in the outer circumference of the base portion 43 at intervals in the circumferential direction. In the present embodiment, the number of notches 46 is set to be the same as the number of slots 45 (that is, the number of teeth 44), and the notches 46 are provided at the outer side of the slots 45 in the radial direction and have the same width as those of the slots 45 in the circumferential direction.

Further, a portion between the notches 46 in the circumferential direction in the outer circumference of the base portion 43 (portion not provided with the notch 46) serves as a projection 47, which projects outward in the radial direction. The projections 47 are provided at the outer side of the teeth 44 in the radial direction. Further, two circumferential side surfaces 44a of each tooth 44 and two circumferential end portions of the projection 47 located at the outer side of the teeth 44 in the radial direction are arranged on the same line as viewed in the axial direction. Furthermore, the outer circumferential end portion of the base portion 43 (that is, the front radial end portion of each projection 47) comes into contact with the inner circumferential surface of the yoke housing 25 in the radial direction (refer to FIG. 2).

Furthermore, in the stator core 41 of the present embodiment, an inner circumference 43a of the base portion 43 is located outward in the radial direction from an inner end portion 44c of each tooth 44. Furthermore, a portion in which the inner end portion 44c of each tooth 44 projects from the inner circumference 43a of the base portion 43 extends to the rear surface of the base portion 43 in the axial direction to be flush with the rear surface.

As shown in FIGS. 2 and 3, the coil 42 is wound around each tooth 44 by a concentrated winding method. Twelve coils 42 are formed as three-phase coils having U, V, and W phases. Furthermore, in a state in which the coils 42 are attached to the teeth 44, the outer end portions of the projections 47 in the radial direction are located at the outside in the radial direction in relation to the outer end portions of the coils 42.

Some of the coils 42 include a lead wire 48a extend from the coil 42 to serve as an end portion of a pilot wire forming the coil 42. The lead wire 48a passes through the notch 46 and extends out of the rear surface of the base portion 43 (on the opposite side to the teeth 44). Further, as shown in FIG. 2, the lead wire 48a passes through an insertion hole (not shown) formed in the bottom portion 25a of the yoke housing 25 and extends out of the yoke housing 25 to be connected to the drive circuit 24 fixed to the outer surface of the bottom portion 25a in the axial direction. Furthermore, a mode of forming the lead wire 48a (the number of lead wires 48a or which coil 42 the lead wire 48a should be drawn from) is appropriately determined according to the winding mode of the coil 42.

Figure 28:
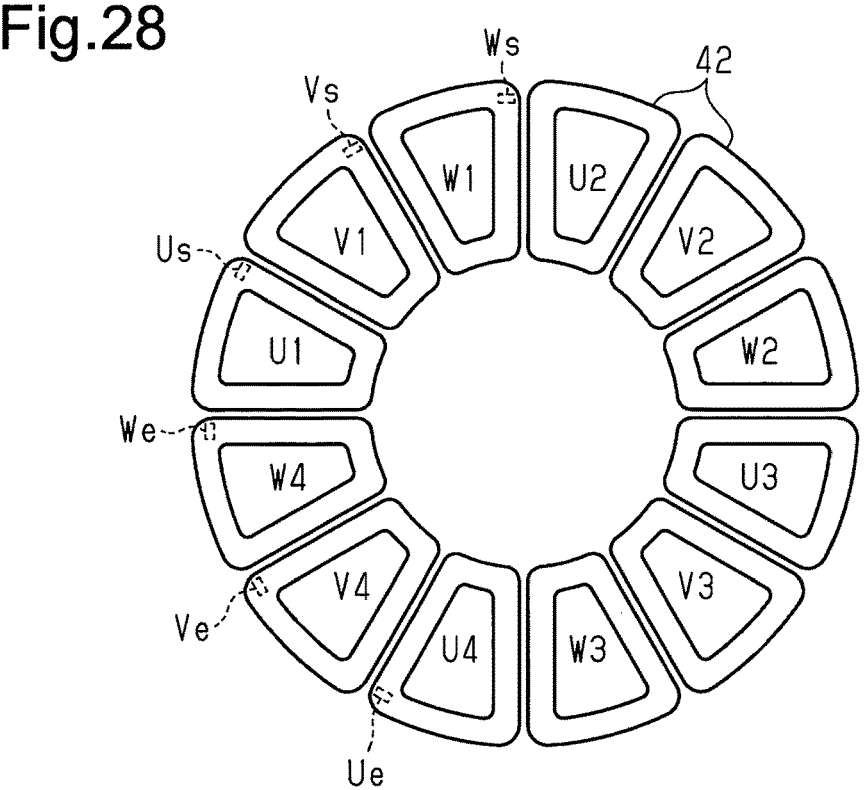
FIG. 28 is a plan view of each coil of the first embodiment.

For example, as shown in FIG. 28, the coils 42 which are classified into three phases are arranged in order of U1, V1, W1, U2, V2, W2, U3, V3, W3, U4, V4, and W4 in the clockwise direction and are wound around the corresponding teeth 44 in the same direction by a concentrated winding method. With regard to each of the phases, the U-phase coils U1 to U4 are located at equal intervals (intervals of 90°) in the circumferential direction. Similarly, the V-phase coils V1 to V4 are located at equal intervals (intervals of) 90° in the circumferential direction. Similarly, the W-phase coils W1 to W4 are located at equal intervals (intervals of 90°) in the circumferential direction.

Figure 27A:
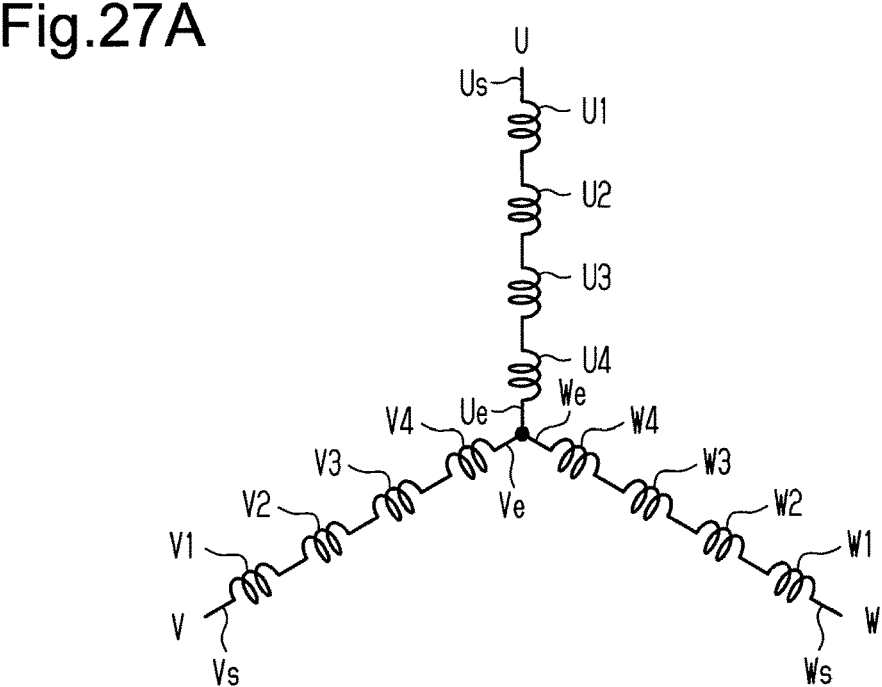
FIG. 27A is an electric circuit diagram showing a coil wire connection mode of a first embodiment and FIG. 27B is an electric circuit diagram showing a coil wire connection mode of a modified example.

As shown in FIG. 27A, the coils 42 are connected in series in each phase. That is, the U-phase coils U1 to U4, the V-phase coils V1 to V4, and the W-phase coils W1 to W4 each form a series circuit. Furthermore, in the present embodiment, the series circuit of the U-phase coils U1 to U4, the series circuit of the V-phase coils V1 to V4, and the series circuit of the W-phase coils W1 to W4 are star-connected.

Further, the U-phase coils U1 to U4 are continuously wound from the winding start U-phase coils U1 to the winding end U-phase coil U4. That is, as shown in FIG. 28, the winding start lead wire 48a (the winding start line Us) extends from the U-phase coil U1, and the winding end lead wire 48a (the winding end line Ue) extends from the U-phase coil U4. This winding mode is also the same in the V-phase coils V1 to V4 and the W-phase coils W1 to W4. That is, the winding start line Vs extends from the V-phase coil V1 and the winding end line Ve is extending from the V-phase coil V4. Further, the winding start line Ws extends from the W-phase coil W1, and the winding end line We extends from the W-phase coil W4.

The lead wires 48a (the winding start lines Us, Vs, and Ws and the winding end lines Ue, Ve, and We) extend in the axial direction and are arranged in the circumferential direction at equal intervals (in the present embodiment, 30°). Further, as described above, the lead wires 48a (the winding start lines Us, Vs, and Ws and the winding end lines Ue, Ve, and We) each pass through the corresponding notches 46 and extend out of the rear surface of the base portion 43 (on the opposite side to the teeth 44). Then, the winding start lines Us, Vs, and Ws pass through the insertion hole and extend out of the yoke housing 25 to be connected to the drive circuit 24 fixed to the outer surface of the bottom portion 25a in the axial direction so that the winding start lines are electrically connected to a power supply. Further, the winding end lines Ue, Ve, and We are electrically connected to one another (refer to FIG. 27A).

The above-described winding mode is an example. That is, the invention is not limited to the above-described star connection and, for example, a delta connection may be employed. Further, the number of lead wires 48a is an example and is appropriately changed according to the winding mode of the coil 42.

Next, the operation of the first embodiment will be described.

When three-phase drive current is supplied from the drive circuit 24 to each coil 42, a rotating magnetic field is generated in the stator 23, and the rotor 22 is rotationally driven in response to the rotating magnetic field. The drive circuit 24 controls the rotational driving of the rotor 22 by controlling the three-phase drive current supplied to each coil 42. Then, when the supply of the current to the coil 42 is stopped, the rotating magnetic field is eliminated and the rotation of the rotor 22 is stopped. At this time, the rotor 22 is stopped at an angular position in which the rotor is in the most magnetically stabilized state with respect to the stator 23.

Figure 5:
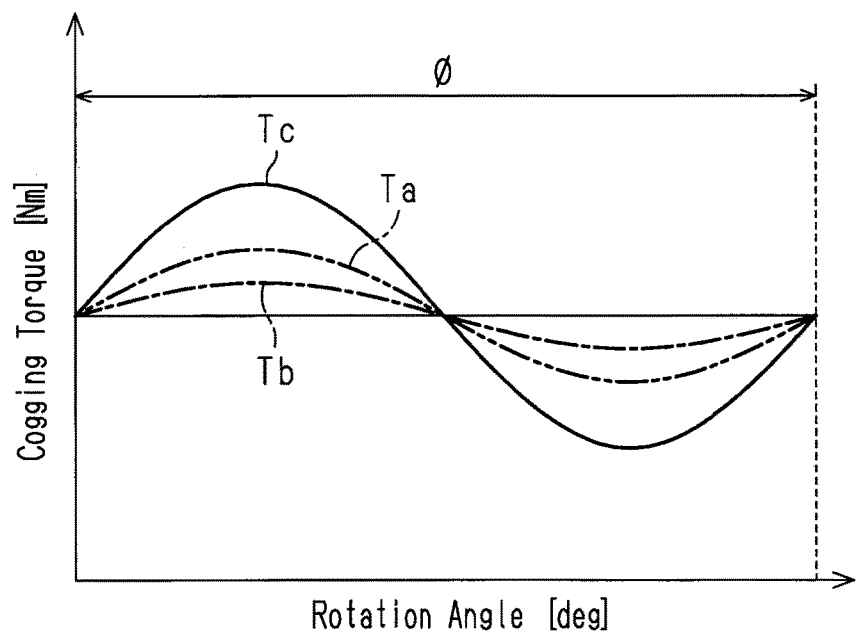
FIG. 5 is a graph illustrating cogging torque of the motor of FIG. 2.

Here, as described above, in the magnet 32 of the rotor 22, the pair of grooves 35 is provided at two sides in the circumferential direction to be separated by an angle θ (=7.5°) from the magnetic pole center line P. Then, an angle formed by the circumferential center lines C1 of the pair of grooves 35 is the same as the cycle φ (=15°) of the cogging torque. For this reason, as shown in FIG. 5, the cogging torque Ta in the case without the groove 35 and the groove cogging torque Tb (the cogging torque due to one groove 35) have the same phase. Accordingly, the groove cogging torque Tb is superimposed on the cogging torque Ta so that the composite cogging torque Tc increases.

Next, the advantages of the first embodiment will be described.

(1) The motor 12 is an axial gap type motor in which the rotor 22 and the stator 23 oppose each other in the axial direction. The axial gap type motor can be decreased in size in the axial direction as compared with a radial gap type motor of the same output (a motor having a configuration in which a rotor and a stator oppose each other in the radial direction). That is, it is possible to reduce projection of the motor 12 from the variable valve timing device 11 (the internal combustion engine 10) by using an axial gap type motor which is advantageous for reducing size in the axial direction as the motor 12 of the variable valve timing device 11, which is an in-vehicle devices. Accordingly, since the vibration of the motor 12 is reduced, noise is reduced.

Further, the motor 12 is attached to the variable valve timing device 11 so that the axial direction is perpendicular to the vertical direction X. In general, the entire vehicle body including the internal combustion engine 10 is vibrated in the vertical direction X in the traveling state. Here, since the rotor 22 and the stator 23 of the motor 12 oppose each other in a direction perpendicular to the vertical direction X (that is, in the horizontal direction), the vibration in the vertical direction X does not affect a gap (air gap G) between the rotor 22 and the stator 23 when the vehicle travels. Accordingly, this reduces changes in the output characteristics of the motor 12 that would result from changes in the air gap G. This improves the reliability of the variable valve timing device 11 including the motor 12.

(2) The axial direction of the axial gap type motor 12 is also perpendicular to the front-rear direction of the vehicle. That is, since the rotor 22 and the stator 23 of the motor 12 oppose each other in a direction perpendicular to the front-rear direction of the vehicle (that is, in the vehicle width direction), the vibration of the vehicle in the front-rear direction does not affect a gap (air gap G) between the rotor 22 and the stator 23. Accordingly, it is possible to further reduce changes in the output characteristics of the motor 12 that would result from changes in the air gap G. As a result, it is possible to further contribute to improvement in reliability of the variable valve timing device 11 with the motor 12.

(3) The axial direction of the axial gap type motor 12 is also perpendicular to the reciprocation direction of the piston 16, which is the main vibration source of the internal combustion engine 10. This reduces the influence of the vibration generated in the internal combustion engine 10 with respect to the air gap G of the motor 12. As a result, it is possible to further improve the reliability of the variable valve timing device 11 including the motor 12.

(4) The rotor 22 has a surface opposing the stator 23. Specifically, the magnet 32 of the rotor 22 has a surface opposing the stator 23. The opposing surface is provided with the groove 35, which extends in the radial direction to adjust the cogging torque (the composite cogging torque Tc) generated in the motor 12. Thus, the groove 35 adjusts the cogging torque in accordance with the in-vehicle device on which the motor is mounted.

In the present embodiment, the position of the rotor 22 is held in a non-energization state in the case of the motor 12 of the variable valve timing device 11. Thus, it is desirable that the position of the rotor 22 be held by the cogging torque in the non-energization state. Thus, in the present embodiment, the formation position of the groove 35 is set based on the cycle of the cogging torque (the angle φ) so as to increase the cogging torque. This further ensures that the position of the rotor 22 is held in a non-energization state due to the cogging torque.

(5) The stator core 41 includes the ring-shaped base portion 43 and the teeth 44, which project from one surface of the base portion 43 in the axial direction and are arranged next to one another in the circumferential direction. Since the outer circumferences of the base portion 43 (the outer end portions of the projections 47 in the radial direction) are located outward from the outer end portions 44b of the teeth 44 in the radial direction, the outer circumferential part of the base portion 43 extends sufficiently outward. Accordingly, it is possible to limit decreases in the number of magnetic paths in the base portion 43.

Then, in this way, the outer circumference of the base portion 43 is extended to the outside and the outer circumference is provided with the notch 46 which is recessed inward in the radial direction. For this reason, it is possible to limit increases in the projection area of the base portion 43 (the stator core 41) in the axial direction while minimizing decreases in the number of magnetic paths in the base portion 43 as described above. In a case in which the stator core 41 is a powder magnetic core (which is formed by press-molding a magnetic powder), a large pressing machine would be required when the projection area of the stator core 41 in the axial direction is enlarged thereby increasing manufacturing costs. For this reason, since an enlargement in projection area of the stator core 41 in the axial direction is limited, increases of the manufacturing cost are limited.

(6) The lead wire 48a extending from the coil 42 is inserted through the notch 46 of the base portion 43. Accordingly, it is possible to accommodate the lead wire 48a in the body of the stator core 41 in the radial direction. This limits increases in the size of the motor 12 in the radial direction.

(7) The output side of the motor 12 is fixed to the variable valve timing device 11 (the internal combustion engine 10) and the drive circuit 24 is provided at a side opposite to the output side of the motor casing 21. This reduces the influence of heat from the internal combustion engine 10 with respect to the drive circuit 24.

Second Embodiment

Hereinafter, a second embodiment of a vehicle motor attachment structure and an in-vehicle device will be described. In the present embodiment, an electric power steering device will be described as an example of the in-vehicle device. In the drawings, elements are illustrated for simplicity and have not necessarily been drawn to scale. Further, same reference numerals are given to those components that are the same as the corresponding components of the first embodiment. The description centers on parts differing from the first embodiment.

Figure 6:
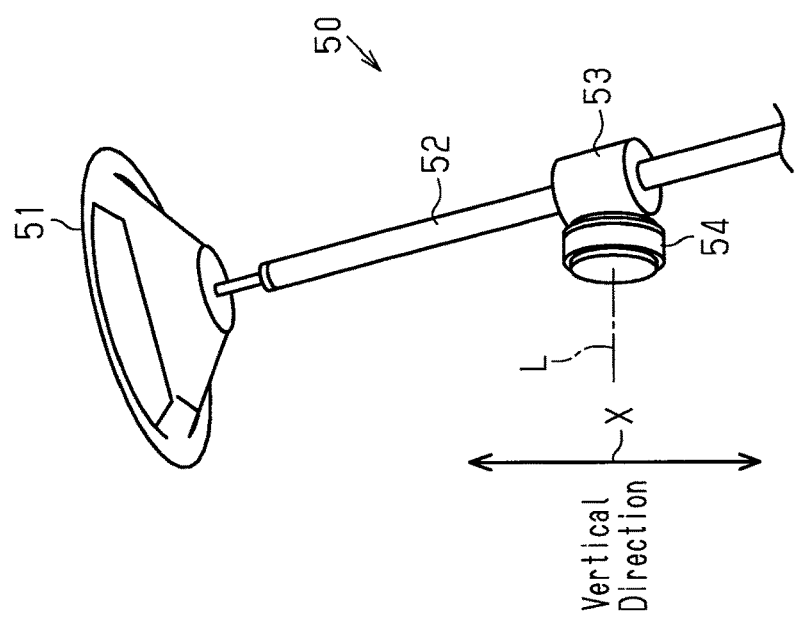
FIG. 6 is a perspective view schematically showing an electric power steering device according to a second embodiment.

As shown in FIG. 6, an electric power steering device 50 of the present embodiment is of a column assist type. The electric power steering device 50 includes a steering shaft 52, to which a steering wheel 51 is connected, and a motor 54, which is connected to the steering shaft 52 through a speed reduction mechanism 53. The motor 54 is controlled in accordance with a vehicle speed or a steering torque detected by a torque sensor (not shown) provided in the speed reduction mechanism 53 and assists power in the driver's operation of the steering wheel 51.

In a state in which the electric power steering device 50 is mounted on the vehicle, the motor 54 is attached to the electric power steering device 50 so that the axial direction (the direction of the axis L) of the motor 54 is perpendicular to the vertical direction X. In other words, in a state in which the electric power steering device 50 is mounted on the vehicle, the axial direction of the motor 54 is parallel to the horizontal direction. Moreover, the axial direction of the motor 54 is also perpendicular to the front-rear direction of the vehicle. That is, the axial direction of the motor 54 is parallel to the vehicle width direction.

Figure 7:
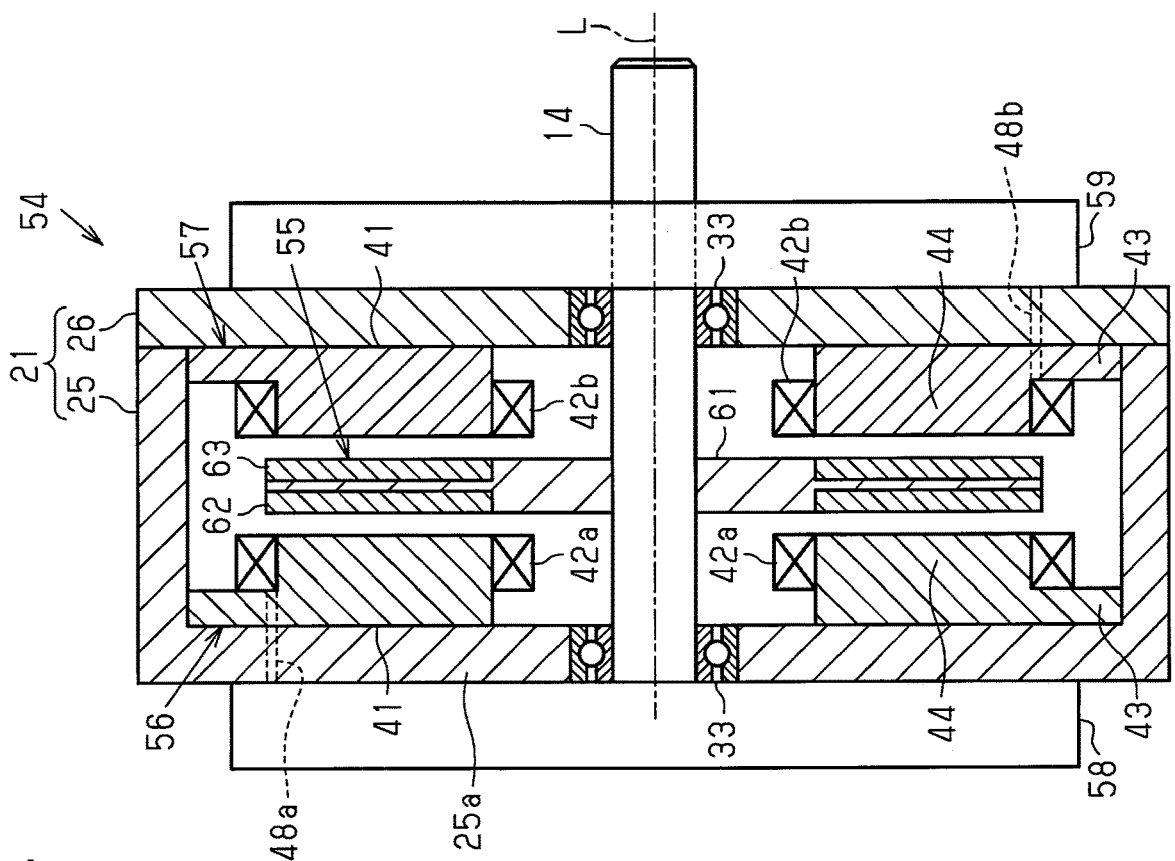
FIG. 7 is a cross-sectional view of a motor of FIG. 6.

As shown in FIG. 7, the motor 54 is an axial gap type brushless motor which includes a rotor 55 having a rotation shaft 14 and a pair of stators (a first stator 56 and a second stator 57) located at two sides of the rotor 55 in the axial direction. The rotor 55 and the first and second stators 56 and 57 are accommodated inside the motor casing 21. Further, the motor 54 includes a pair of drive circuits (a first drive circuit 58 and a second drive circuit 59) provided at two sides of the motor casing 21 in the axial direction. The first and second drive circuits 58 and 59 are respectively electrically connected to the first and second stators 56 and 57.

Furthermore, in the present embodiment, the rotation shaft 14 of the rotor 55 projects outward while extending through the end frame 26 and the second drive circuit 59 in the axial direction, and the projection portion serves as an output portion connected to the speed reduction mechanism 53.

Figure 8:
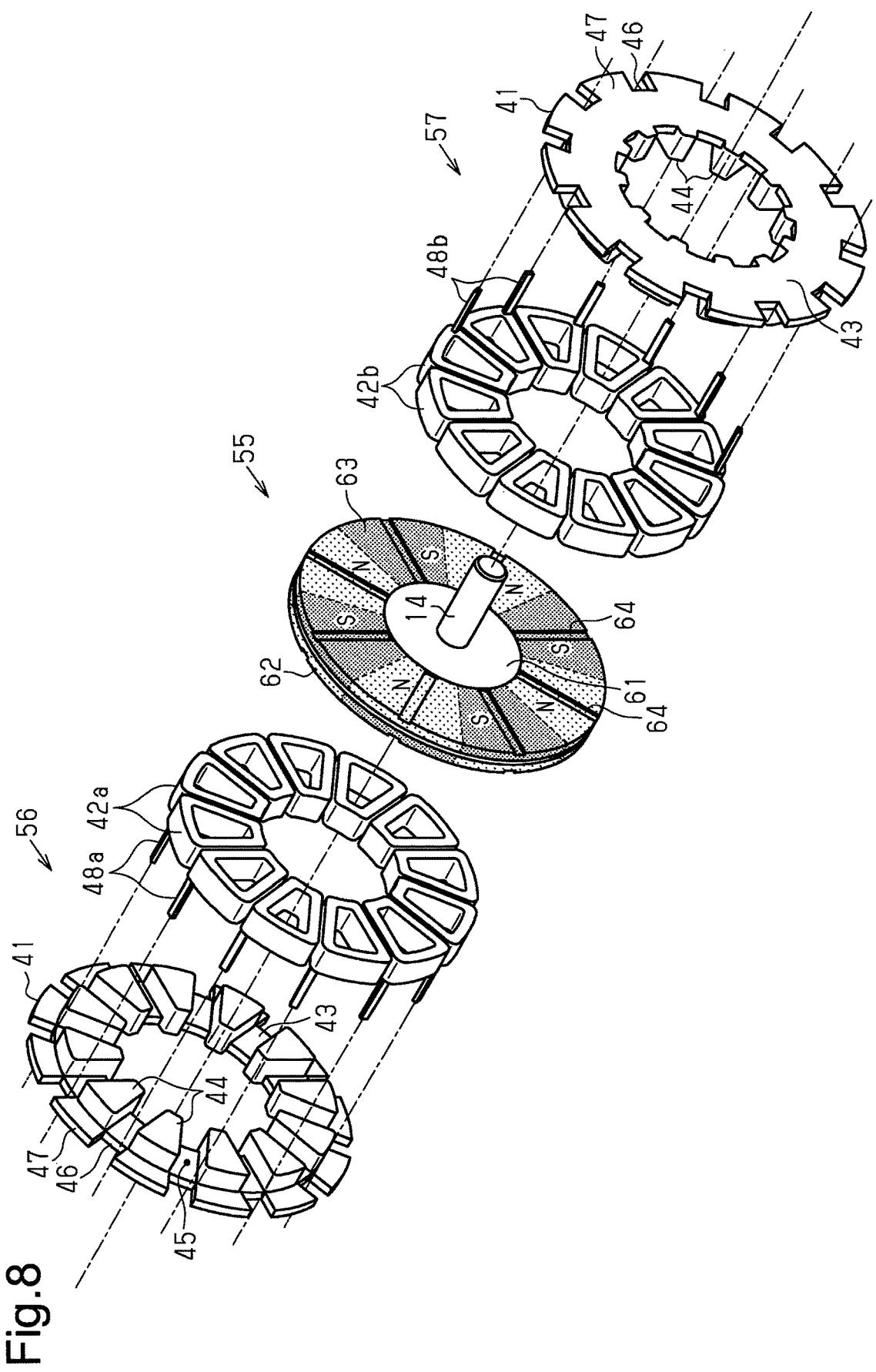
FIG. 8 is an exploded perspective view of a rotor and a stator of FIG. 7.

As shown in FIGS. 7 and 8, the rotor 55 includes a disc-shaped rotor core 61 in which the rotation shaft 14 is fixed to the center portion and a first magnet (a first magnetic pole portion) 62 and a second magnet (a second magnetic pole portion) 63, which are respectively fixed to two end surfaces of the rotor core 61 in the axial direction. The rotor core 61 is perpendicular to the rotation shaft 14. Further, the rotor core 61 and the rotation shaft 14 are fixed to each other to be integrally rotatable. Each of the first and second magnets 62 and 63 is a ring-shaped magnet extending about the axis L and magnetized in the axial direction.

Figure 9:
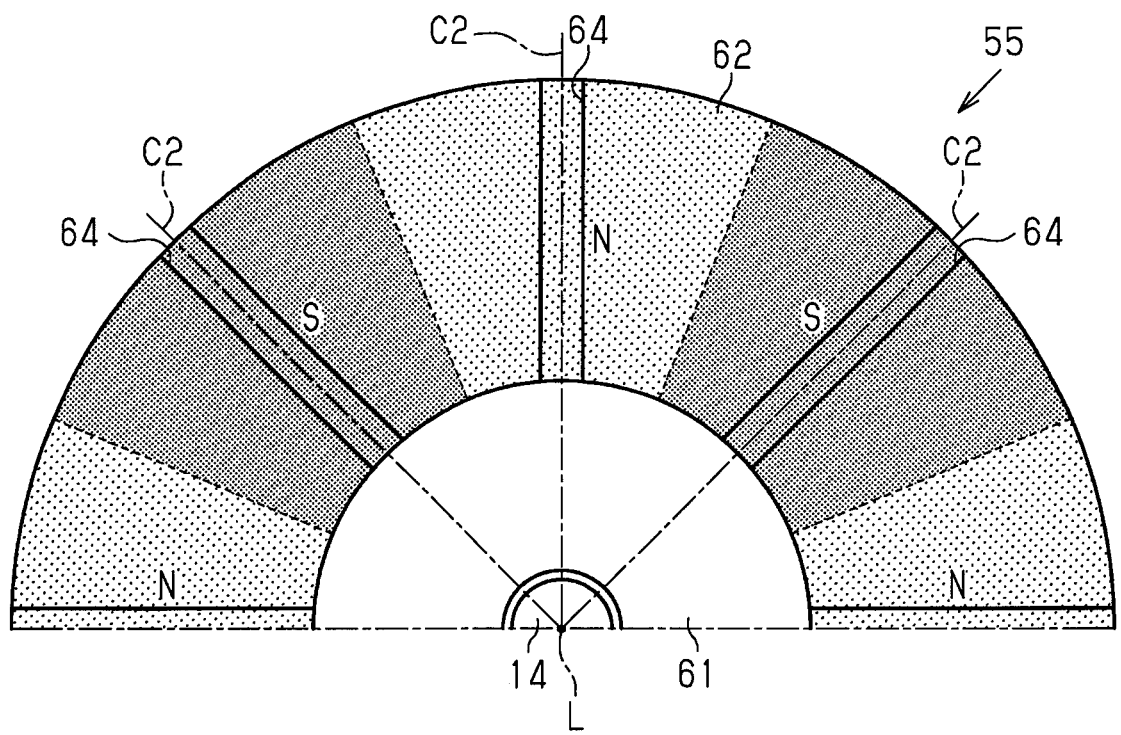
FIG. 9 is a plan view showing part of the rotor of FIG. 8.

As shown in FIG. 9, the first magnet 62 fixed to one end surface of the rotor core 61 in the axial direction has eight magnetic poles in the circumferential direction, in which an N pole and an S pole are alternately set in the circumferential direction. Eight poles of the first magnet 62 are provided at equal angular intervals in the circumferential direction. Furthermore, the number of magnetic poles of the rotor 55 of the present embodiment is 2m×n (m and n are natural numbers). In the present embodiment, the number of magnetic poles of the rotor 55 is "eight" since m is 2 and n is 4.

Further, a plurality of grooves 64 extending in the radial direction are provided in an end surface near the first stator 56 in the axial direction in the first magnet 62 (a surface opposing the first stator 56) to correspond to the magnetic poles of the first magnet 62. Each groove 64 is linear and extends in the radial direction from the inner peripheral end portion to the outer circumferential end portion of the first magnet 62. Further, the grooves 64 are provided along the circumferential centers (the magnetic pole centers C2) of the magnetic poles of the first magnet 62 and have a predetermined width with respect to the magnetic pole center C2.

As shown in FIG. 8, the second magnet 63, which is fixed to the other end surface of the rotor core 61 in the axial direction, has the same configuration as that of the first magnet 62. Further, the second magnet 63 has eight magnetic poles set at equal angular intervals in the circumferential direction. The second magnet 63 is fixed to the rotor core 61 so as to be separated from the first magnet 62 by one magnetic pole in the circumferential direction. Thus, each magnetic pole of the first magnet 62 and each magnetic pole of the second magnet 63 overlapping each other in the axial direction are set as different magnetic poles (N and S poles).

Each of the first and second stators 56 and 57 located at two sides of the rotor 55 in the axial direction has the same configuration as the stator 23 of the first embodiment. Specifically, as shown in FIGS. 7 and 8, the first and second stators 56 and 57, which are located at two sides of the rotor 55 in the axial direction, have the same configuration. Each of the stators 56 and 57 includes an annular stator core 41, which is supported by the motor casing 21, and a plurality of coils 42a and 42b, which are wound around the stator core 41. Furthermore, the coil of the first stator 56 is set as a first coil 42a, and the coil of the second stator 57 is set as a second coil 42b.

The stator core 41 is a powder magnetic core, which is formed by press-molding a magnetic powder. The stator core 41 includes a ring-shaped base portion 43, which functions as a back yoke, and twelve teeth 44, which project in the axial direction from the base portion 43 toward the rotor 55.

Figure 11:
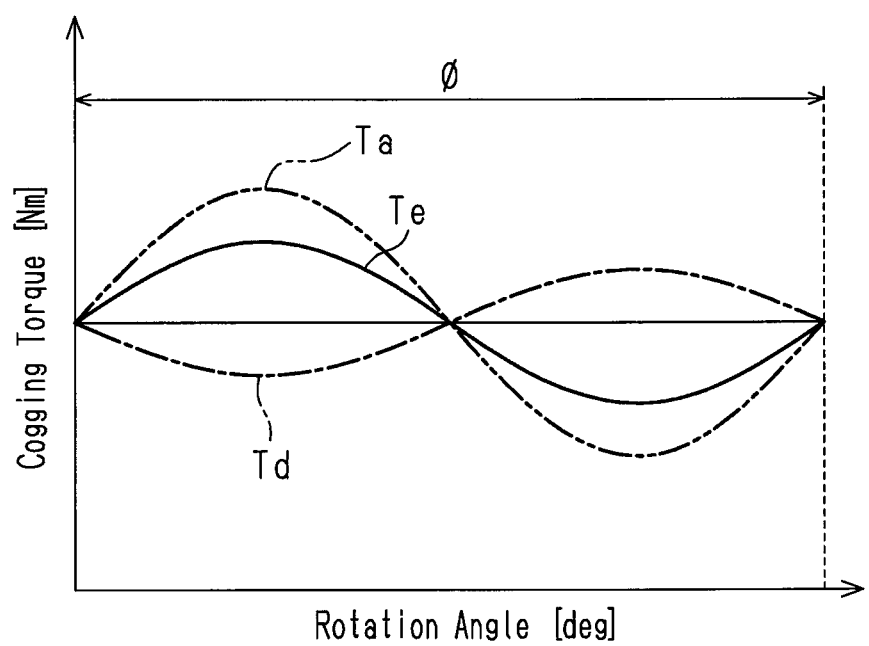
FIG. 11 is a graph illustrating cogging torque of the motor of FIG. 7.

As shown in FIGS. 8 and 11, twelve teeth 44 are arranged at equal angular intervals (in the present embodiment, intervals of 30°) in the circumferential direction. Each tooth 44 is substantially sectoral, as viewed in the axial direction, and cylindrical so as to project to a predetermined height in the axial direction. The twelve teeth 44 are identical in construction. An axial front end surface of each tooth 44 (an end surface near the rotor 55 in the axial direction) is flat and perpendicular to the axis L of the rotation shaft 14. Further, the teeth 44 that are adjacent to each other in the circumferential direction are separated from each other in the circumferential direction to form a gap serving as a slot 45 through which the coils 42a and 42b pass. Each of the slots 45 has a constant width in the radial direction. That is, circumferential side surfaces 44a of the pair of teeth 44 opposing each other in the circumferential direction are parallel to each other.

The outer diameter of the base portion 43 is set to be larger than the diameter of an outer end portion 44b of each tooth 44 in the radial direction. Then, a plurality of notches 46 are arranged in the outer circumference of the base portion 43 at intervals in the circumferential direction. In the present embodiment, the number of notches 46 is set to be the same as the number of slots 45 (that is, the number of teeth 44). The notches 46 are provided at the outer side of the slots 45 in the radial direction and have the same width as the slots 45 in the circumferential direction.

Further, a portion between the notches 46 in the circumferential direction in the outer circumference of the base portion 43 (a portion not provided with the notch 46) serves as a projection 47, which projects outward in the radial direction. The projections 47 are provided at the outer side of the teeth 44 in the radial direction. Further, two circumferential side surfaces 44a of each tooth 44 and two circumferential end portions of the projection 47 located at the outer side of the teeth 44 in the radial direction are arranged on the same line as viewed in the axial direction. Furthermore, the outer circumferential end portion of the base portion 43 (that is, the front radial end portion of each projection 47) comes into contact with the inner peripheral surface of the yoke housing 25 in the radial direction (refer to FIG. 7).

Figure 10:
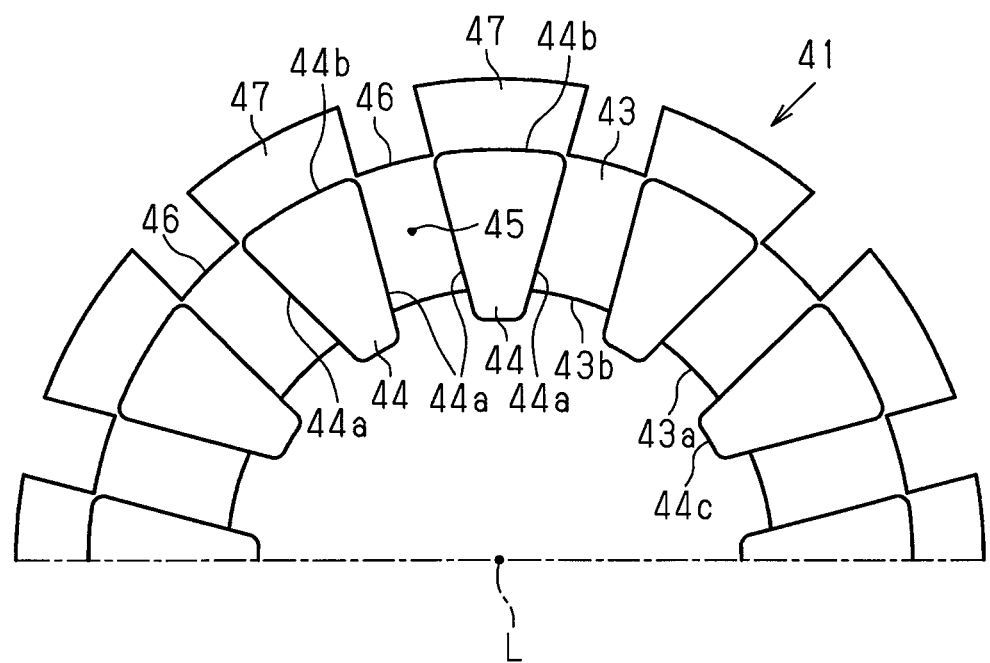
FIG. 10 is a plan view showing part of a stator core of FIG. 8.

In the stator core 41 of the present embodiment, an inner circumference 43a of the base portion 43 is located outward in the radial direction from an inner end portion 44c of each tooth 44 to form a notch 43b, which is recessed outward in the radial direction (refer to FIG. 10). Furthermore, a portion in which the inner end portion 44c of each tooth 44 projects from the inner circumference 43a of the base portion 43 extends in the axial direction to a rear surface of the base portion 43 and is flush with the rear surface.

As shown in FIGS. 7 and 8, the coils 42a and 42b are wound around the teeth 44 of the stators 56 and 57 by a concentrated winding method. Each of twelve coils 42a and 42b is formed as a three-phase coil having U, V, and W phases. Furthermore, in a state in which the coils 42a and 42b are attached to the teeth 44, the outer end portions of the projections 47 in the radial direction are located at the outside in the radial direction from the outer end portions of the coils 42a and 42b.

The first stator 56 and the second stator 57 are arranged so that the teeth 44 oppose each other in the axial direction and the rotor core 61 and the first and second magnets 62 and 63 are arranged in between. That is, each tooth 44 of the first stator 56 and the first coil 42a oppose the first magnet 62 of the rotor 55 in the axial direction. Similarly, each tooth 44 of the second stator 57 and the second coil 42b oppose the second magnet 63 of the rotor 55 in the axial direction. Furthermore, the first stator 56 is fixed to the inner surface of the bottom portion 25a of the yoke housing 25, and the second stator 57 is fixed to the inner surface of the end frame 26 in the axial direction. Further, each coil 42a of the first stator 56 and each coil 42b of the second stator 57 are arranged so as not to be separated from each other in the circumferential direction (one projection image overlaps the other projection image in the axial direction).

As shown in FIG. 7, the first drive circuit 58 is provided at a side opposite to the output side of the motor casing 21 and the second drive circuit 59 is provided at the output side of the motor casing 21. Specifically, the first drive circuit 58 is fixed to the outer surface of the bottom portion 25a of the yoke housing 25 in the axial direction. Further, the second drive circuit 59 is fixed to the outer surface of the end frame 26 in the axial direction. Furthermore, in the present embodiment, the rotation shaft 14 of the rotor 55 projects outward and extends through the end frame 26 and the second drive circuit 59 in the axial direction, and the projection portion serves as an output portion connected to the speed reduction mechanism 53.

A lead wire 48a, which is an end portion of a pilot wire forming the first coil 42a, extends from some of the first coils 42a of the first stator 56 in the axial direction. The lead wire 48a passes through the notch 46 of the stator core 41 in the first stator 56 and extends out of the rear surface of the base portion 43 (on the opposite side to the teeth 44). Moreover, the lead wire 48a passes through an insertion hole (not shown) formed in the bottom portion 25a of the yoke housing 25, extends out of the yoke housing 25, and is connected to the first drive circuit 58.

Similarly, a lead wire 48b, which is an end portion of a pilot wire forming the second coil 42b, extends from some of the second coils 42b of the second stator 57 in the axial direction. The lead wire 48b passes through the notch 46 of the stator core 41 in the second stator 57 and extends out of the rear surface of the base portion 43 (on the opposite side to the teeth 44). Moreover, the lead wire 48b passes through an insertion hole (not shown) formed in the end frame 26, extends out of the motor casing 21, and is connected to the second drive circuit 59. Furthermore, a mode of forming the lead wires 48a and 48b (the number of lead wires 48a and 48b or the extended positions of the coils 42a and 42b) is appropriately determined according to the winding mode of the coils 42a and 42b.

In this way, the set of the first stator 56 and the first drive circuit 58 and the set of the second stator 57 and the second drive circuit 59 are electrically separated from each other. The first drive circuit 58 controls three-phase drive current supplied to each of the first coils 42a of the first stator 57, and the second drive circuit 59 controls three-phase drive current supplied to each of the second coils 42b of the second stator 57.

Figure 30:
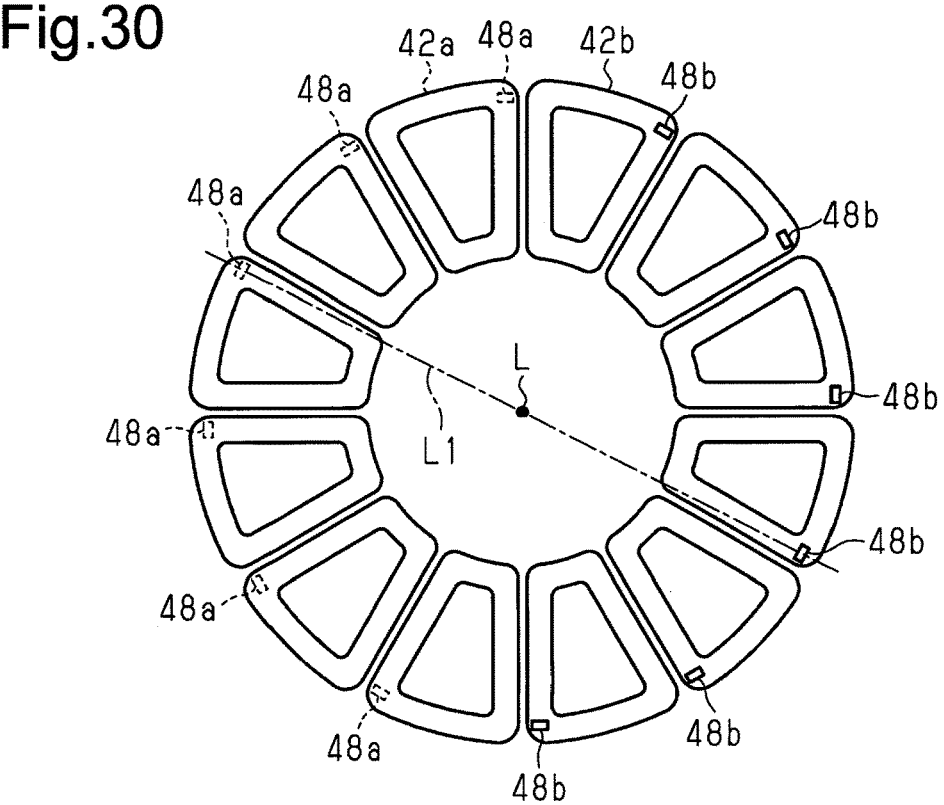
FIG. 30 is a schematic diagram illustrating a position of a lead wire of a coil of the second embodiment.

The winding mode of the coils 42a and 42b of the first and second stators 56 and 57 is the same as that of the first embodiment. Specifically, as shown in FIGS. 8 and 30, the lead wires 48a are respectively extending from six coils 42a arranged adjacently in the circumferential direction of the first stator 56. Six first lead wires 48a are arranged at equal intervals (in the present embodiment, intervals of 30°) in the circumferential direction.

Similarly, the lead wires 48b are respectively extending from six coils 42b arranged adjacently in the circumferential direction in the second stator 57. Six second lead wires 48b are arranged at equal intervals (in the present embodiment, intervals of 30°) in the circumferential direction.

Each of six first lead wires 48a and each of six second lead wires 48b are located at 180-degree opposing positions about the axis L as viewed from the direction of the axis L of the rotation shaft 14. In other words, the first lead wire 48*a* and the second lead wire 48*b*, which correspond to each other, are located at positions sandwiching the axis L and overlapping the line L1 perpendicular to the axis L as viewed from the direction of the axis L. With such a configuration, all of the first lead wires 48*a* do not overlap the second lead wires 48*b* in the axial direction. Moreover, twelve lead wires obtained by adding the first lead wires 48*a* and the second lead wires 48*b* are arranged at equal intervals (in the present embodiment, intervals of 30°) in the circumferential direction.

Further, in the present embodiment, the radial positions (the dimensions from the axis L) of each of the first lead wires 48*a* and each of the second lead wires 48*b* are set to the same. That is, each of the first lead wires 48*a* and each of the second lead wires 48*b* are arranged to be point-symmetrical to each other with respect to the axis L.

Next, the operation of the second embodiment will be described.

When three-phase drive current is supplied from the first drive circuit 58 to each coil 42*a* of the first stator 56, a rotating magnetic field is generated in the first stator 56. Further, when three-phase drive current is supplied from the second drive circuit 59 to each coil 42*b* of the second stator 57, a rotating magnetic field is generated in the second stator 57. Then, the rotor 55 is rotationally driven in response to the rotating magnetic field generated in the first and second stators 56 and 57.

Here, as described above, the groove 64 is provided at each of the magnetic pole centers C2 of the first and second magnets 62 and 63 of the rotor 55. For this reason, as shown in FIG. 11, the cogging torque Ta in the case without the groove 64 and the groove cogging torque Td (the cogging torque due to the groove 64) have opposite phases (a phase difference of 180°). Accordingly, in the composite cogging torque Te obtained by combining the cogging torque Ta and the groove cogging torque Td, the cogging torque Ta is subtracted by the amount of the groove cogging torque Td so that the composite cogging torque Te is decreased.

The second embodiment obtains advantages (1), (2), (3), and (5) of the first embodiment in addition to the advantages described below.

(8) The motor 54 includes a pair of stators (the first and second stators 56 and 57) provided at two sides of the rotor 55 in the axial direction. Further, the motor 54 includes a first drive circuit 58, which is connected to the coil 42*a* of the first stator 56 and supplies a drive current to the coil 42*a* and a second drive circuit 59 which is connected to the coil 42*b* of the second stator 57 and supplies a drive current to the coil 42*b*. According to this configuration, the set of the first stator 56 and the first drive circuit 58 and the set of the second stator 57 and the second drive circuit 59 are electrically separated from each other, and the coils 42*a* and 42*b* of two sets are separated from each other with the rotor 55 located in between. Thus, when one set has a failure such that the coil 42*a* (42*b*) of the set is heated, the influence of the heat on the other set of the coil 42*b* (42*a*) is minimized. This improves redundancy.

(9) The outer circumference of the base portion 43 of each of the first and second stators 56 and 57 is provided with the notch 46, recessed in the radial direction. Thus, motor components such as element wires forming the coils 42*a* and 42*b* can be arranged in the notch 46. That is, since a degree of freedom in the arrangement of the motor components increases, the motor components can be efficiently arranged.

Accordingly, it is possible to decrease the sizes of the stators 56 and 57 and to further decrease the size of the motor 54.

Further, in the second embodiment, the inner circumference of the base portion 43 of each of the first and second stators 56 and 57 is also provided with the notch 43*b*. Thus, motor components such as element wires forming the coils 42*a* and 42*b* can be arranged in the notch 43*b*. This allows for reduction in the size of the stators 56 and 57 and the size of the motor 54.

(10) The lead wire 48*a* extending from the first coil 42*a* and the lead wire 48*b* extending from the second coil 42*b* are inserted through the notches 46 of the base portions 43 of the corresponding stators 56 and 57. Accordingly, it is possible to receive the lead wires 48*a* and 48*b* inside the body of the stator core 41 in the radial direction. This limits enlargement of the motor 54 in the radial direction.

(10) A surface opposing the first stator 56 in the first magnet 62 of the rotor 55 and a surface opposing the second stator 57 in the second magnet 63 are each provided with the groove 64 extending in the radial direction to adjust the cogging torque (the composite cogging torque Te) generated in the motor 54. The groove 64 allows for adjustment of the cogging torque in accordance with an in-vehicle device on which the motor is mounted.

When a function of holding the position of the rotor 55 in a non-energization state is not particularly necessary as in the motor 54 of the electric power steering device 50 of the present embodiment, it is desirable that vibration and noise of the motor 54 be decreased by reducing the cogging torque. Thus, in the present embodiment, it is possible to decrease the cogging torque (the composite cogging torque Te) by setting the groove 64 to the magnetic pole centers C2 of the first and second magnets 62 and 63.

(11) The motor 54 is an axial gap type motor in which the rotor 55 opposes the first and second stators 56 and 57 in the axial direction and is attached to the electric power steering device 50 so that the axial direction be perpendicular to the vertical direction X. In general, the entire vehicle body including the electric power steering device 50 is mainly vibrated in the vertical direction X in a traveling state. Since the rotor 55 and each of the stators 56 and 57 of the motor 54 oppose each other in a direction (that is, the horizontal direction) perpendicular to the vertical direction X, the vibration generated in the vertical direction X when the vehicle travels does not affect a gap (an air gap) between the rotor 55 and each of the stators 56 and 57. This limits changes in the output characteristics of the motor 54 generated by changes in the air gap. As a result, the reliability of the electric power steering device 50 including the motor 54 is improved.

Further, in the present embodiment, the lead wires 48*a* and 48*b* (at least their basal portions) of the first and second stators 56 and 57 are arranged at equal intervals in the circumferential direction. This obtains a satisfactory structural balance (weight balance) about the axis L. As a result, it is possible to appropriately reduce the vibration of the motor 54 caused by resonance or the like. Accordingly, it is possible to more appropriately limit changes in the air gap between the rotor 55 and the first and second stators 56 and 57 and further improve the reliability of the electric power steering device 50.

Further, in the present embodiment, the first lead wire 48*a* (at least a root position thereof) and the second lead wire 48*b* (at least a root position thereof) are located at 180-degree opposing positions about the axis L of the rotation shaft 14 (the rotation axis of the motor 54). This obtains a further satisfactory structural balance (weight balance) about the axis L. As a result, it is possible to further reduce the vibration of the motor caused by resonance or the like. Accordingly, it is possible to further limit changes in the air gap between the rotor and the stator and to further improve the reliability of the in-vehicle device. Further, in the present embodiment, since the radial positions (the dimensions from the axis L) of the first lead wire 48*a* and the second lead wire 48*b* are set to the same, it is possible to obtain a further satisfactory structural balance (weight balance) about the axis L.

The first and second embodiments may be modified as described below.

Figure 12:
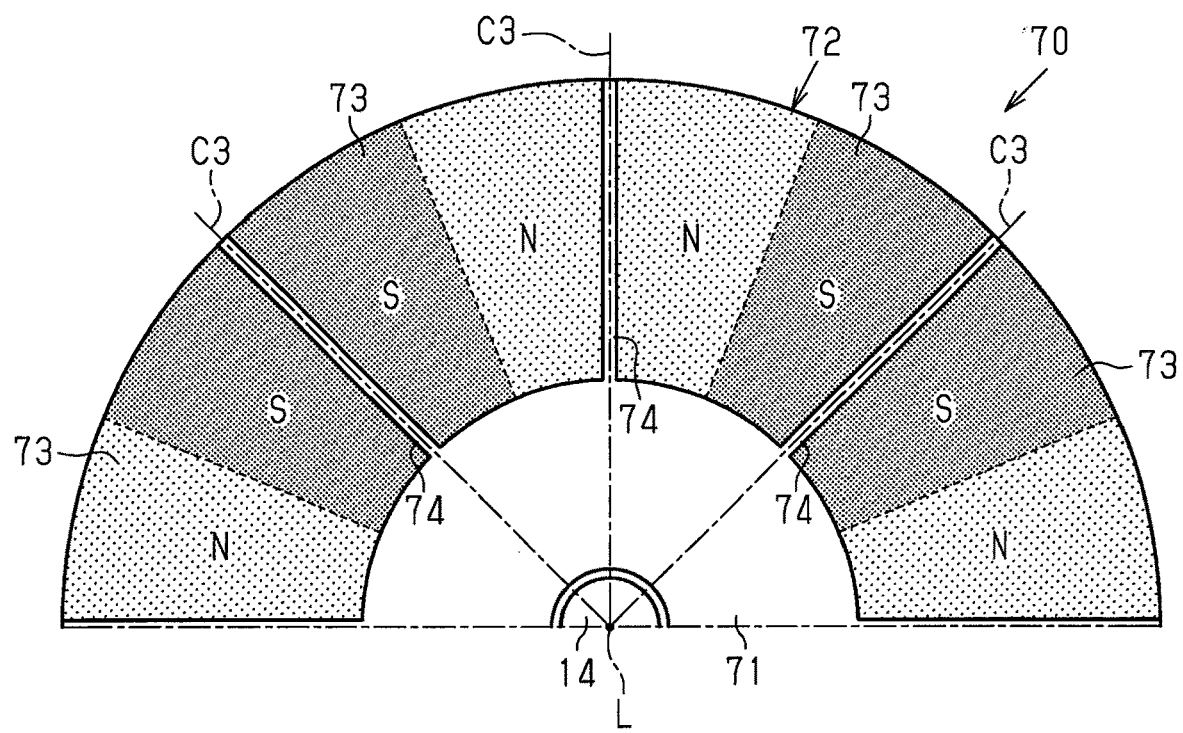
FIG. 12 is a plan view showing part of a rotor of a modified example.

A rotor 70 shown in FIG. 12 includes a disc-shaped rotor core 71, in which the rotation shaft 14 is connected to a center portion, and a magnet group 72, which is provided in an axial end surface of the rotor core 71. The magnet group 72 includes a plurality of (in the same example, eight) magnets 73 which are arranged next to one another at equal intervals in the circumferential direction.

Each magnet 73 of the magnet group 72 fixed to one end surface of the rotor core 71 in the axial direction is sectoral as viewed in the axial direction. Further, the magnets 73 are arranged at intervals in the circumferential direction and a portion (an inter-magnet portion 74) between the magnets 73 adjacent to each other in the circumferential direction has a constant width in the radial direction. Further, the circumferential center line of each inter-magnet portion 74 is formed to intersect the axis L of the rotation shaft 14. Furthermore, the inter-magnet portion 74 may be a void, and part of the rotor core 71 may be arranged within the inter-magnet portion 74.

Each magnet 73 is magnetized in the axial direction so that two different magnetic poles (N and S poles) are formed on the axial end surface with the circumferential center serving as a boundary. Further, the magnets 73 are configured such that adjacent N poles in the circumferential direction sandwich the inter-magnet portion 74 and adjacent S poles in the circumferential direction sandwich the inter-magnet portion 74. Accordingly, a pair of N poles adjacent to each other in the circumferential direction in the magnet 73 forms one N pole of the magnet group 72 and a pair of s poles adjacent to each other in the circumferential direction forms one S pole of the magnet group 72. Further, the N and S poles of the magnet group 72 are alternately set at the equal angular intervals in the circumferential direction and the number of poles of the magnet group 72 is the same as the number of poles of the magnet 73 (that is, eight poles). Further, each inter-magnet portion 74 is located at the circumferential center (the magnetic pole center C3) of each magnetic pole of the magnet group 72.

According to such a configuration, since each inter-magnet portion 74 is located at each magnetic pole center C3 of the magnet group 72, the inter-magnet portion 74 acts similarly to the groove 64 of the second embodiment and hence the cogging torque can be decreased. Further, in the same configuration, since it is possible to adjust the cogging torque without providing the groove in the magnet 73, it is easy to manufacture the magnet 73. Specifically, according to this configuration, when the same polarity of the pair of magnets 73 adjacent to each other in the circumferential direction is regarded as one magnetic pole of the rotor 70, the inter-magnet portion 74 is arranged inside the magnetic pole of the rotor 70. For this reason, it is possible to adjust the cogging torque so as to conform to an in-vehicle device on which the motor is to be mounted by adjusting a configuration such as the width or the position of the inter-magnet portion 74. For this reason, it is particularly effective when using a sintered magnet or the like which is often restricted in forming shape. Furthermore, each magnet 73 magnetized in advance may be fixed to the rotor core 71 when manufacturing the rotor 70 and each magnet 73 not magnetized may be fixed to the rotor core 71 and may be magnetized.

Furthermore, in the example of FIG. 12, the inter-magnet portion 74 is located at the magnetic pole center C3 of the magnet group 72 to decrease the cogging torque. However, the invention is not particularly limited to such a structure. For example, the inter-magnet portion 74 may be separated from the magnetic pole center C3 in the circumferential direction to increase the cogging torque. In this case, it is desirable to set the mode of setting the position of the inter-magnet portion 74 to be the same as the mode of setting the position of the groove 35 of the first embodiment.

Figure 13:
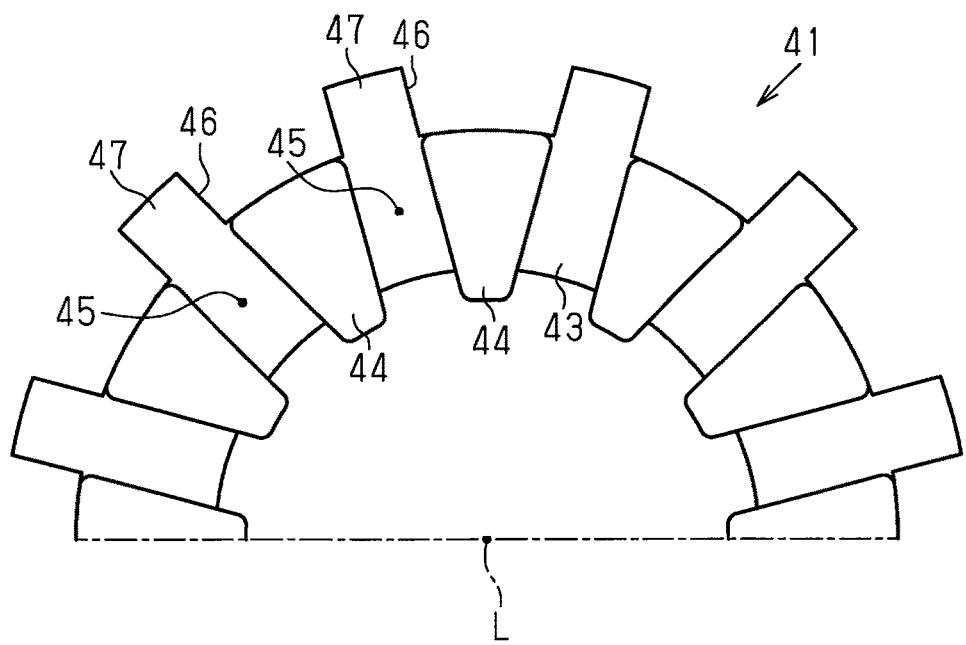
FIG. 13 is a plan view showing part of a stator core of a modified example.

In the stator core 41, each notch 46 is located at the outer side of each slot 45 in the radial direction. For example, as shown in FIG. 13, each notch 46 may be provided at the outer side of each tooth 44 in the radial direction. In this case, each projection 47 of the base portion 43, located between the notches 46 in the circumferential direction, is provided at the outer side of each slot 45 in the radial direction.

The formation position of the notch 46 is not limited to the outer circumference of the base portion 43 and the notch may be provided at the inner circumference of the base portion 43.

Figure 14:
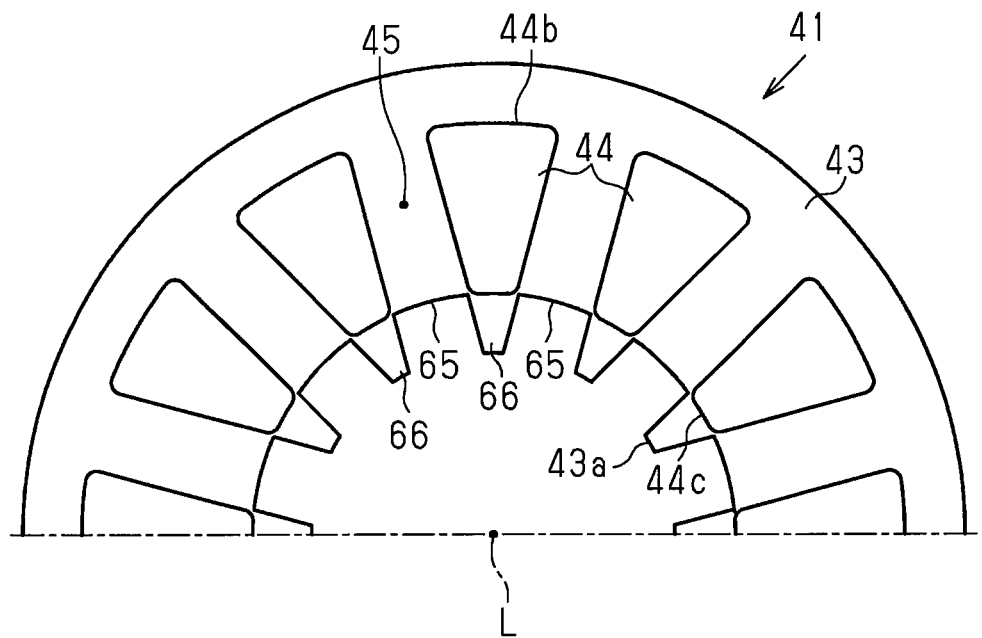
FIG. 14 is a plan view showing part of a stator core of a modified example.

For example, in the configuration shown in FIG. 14, the inner diameter of the base portion 43 (the diameter of the inner circumference 43*a*) is set to be smaller than the diameter of the inner end portion 44*c* of each tooth 44 in the radial direction. Then, the inner circumference 43*a* of the base portion 43 is provided with a plurality of notches 65 arranged at intervals in the circumferential direction. In the same configuration, the number of notches 65 is set to be the same as the number of slots 45 (that is, the number of teeth 44) and each notch 65 is provided at the inside of each slot 45 in the radial direction. Further, a portion in the circumferential direction between the notches 65 in the inner circumference 43*a* of the base portion 43 (a portion not provided with the notch 65) serves as a projection 66 projecting inward in the radial direction. Each projection 66 is provided at the inside of each tooth 44 in the radial direction.

Figure 15:
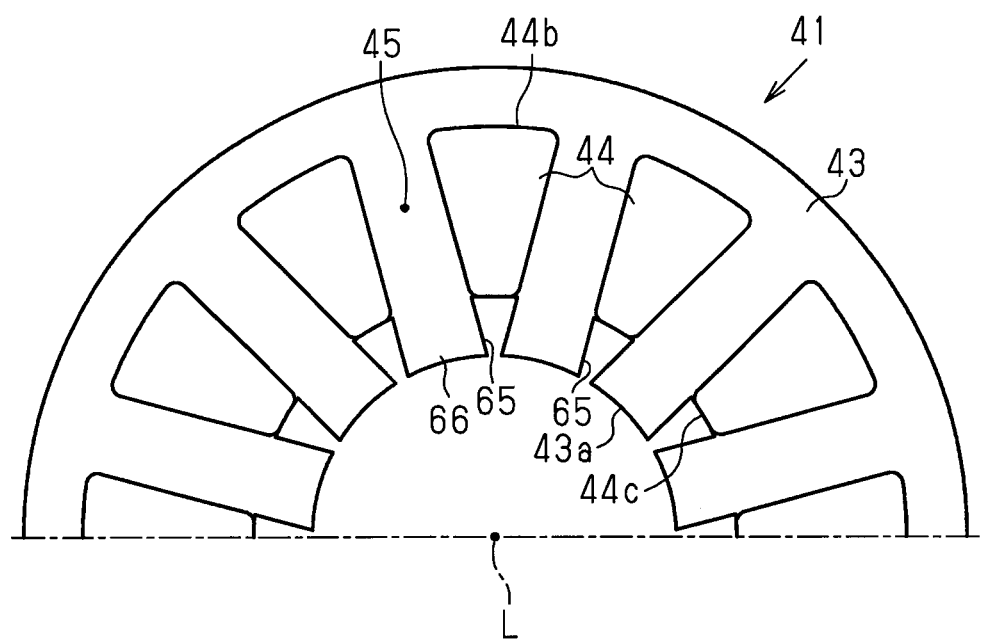
FIG. 15 is a plan view showing part of a stator core of a modified example.

Also with the same configuration, it is possible to substantially obtain advantages (5) of the first embodiment and (9) of the second embodiment. Furthermore, for example, as shown in FIG. 15, each of the notches 65 may be provided at the inside of each tooth 44 in the radial direction by changing the configuration shown in FIG. 14.

In the second embodiment, the inner circumference 43*a* of the base portion 43 is located outward in the radial direction in relation to the inner end portion 44*c* of each tooth 44 so that the notch 43*b* is formed between the teeth 44. However, the invention is not limited to such a structure. The inner circumference 43*a* of the base portion 43 may be set to the inside in the radial direction in relation to the inner end portion 44*c* of the teeth 44 so that the notch 43*b* does not exist. Further, each notch 46 of the outer circumference of the base portion 43 may be omitted.

In the stator core 41, the number of notches 46 is set to the same number of slots 45, but does not have to be essentially the same as the number of slots 45. That is, the number of notches may be appropriately changed.

Figure 16:
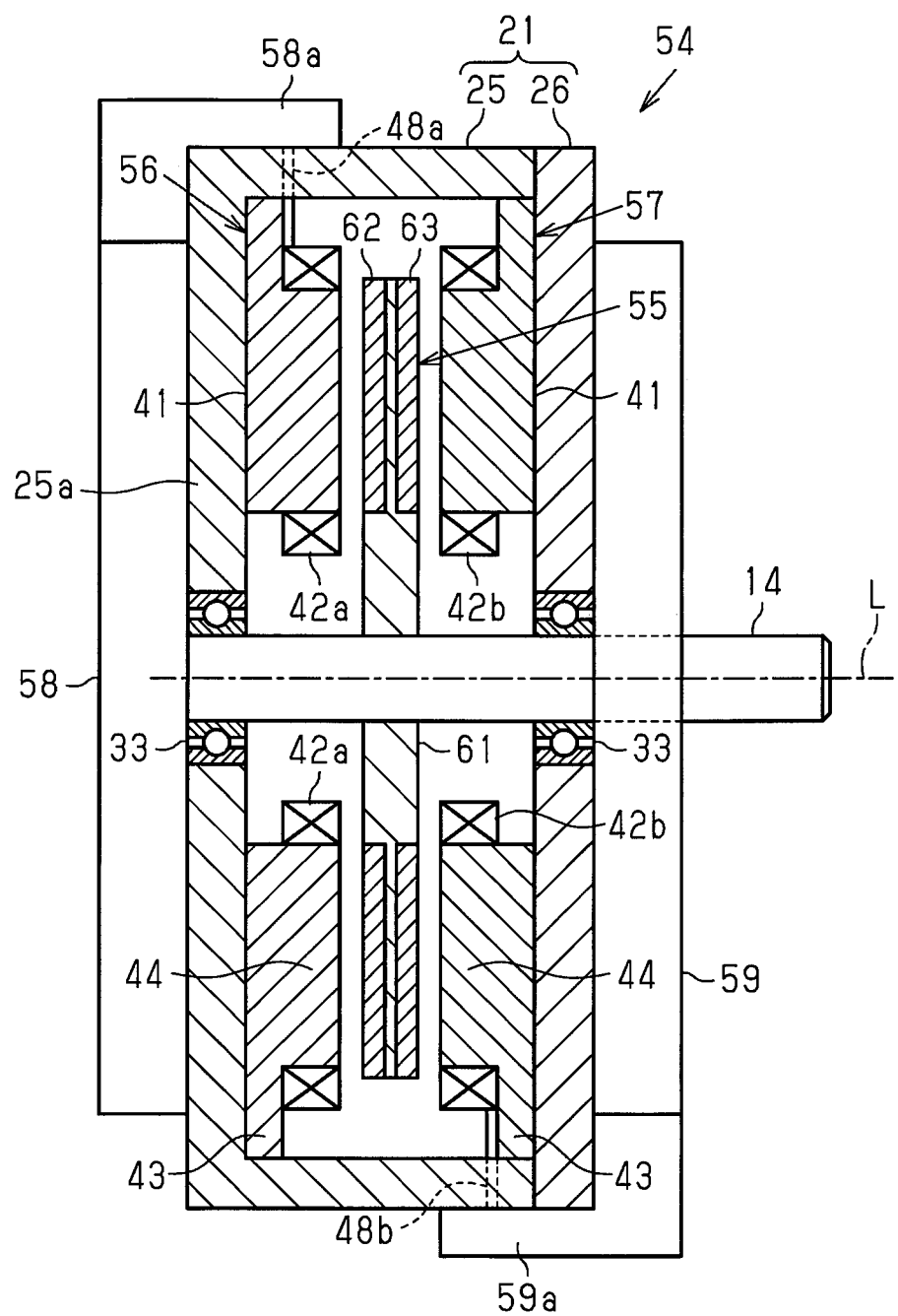
FIG. 16 is a cross-sectional view of a motor of a modified example.

In the first and second embodiments, the lead wires 48*a* and 48*b* of the coils 42*a* and 42*b* are drawn out in the axial direction. However, the invention is not particularly limited to such a structure. For example, as a modified example of the second embodiment, in the configuration shown in FIG. 16, the lead wires 48a and 48b extend outward in the radial direction from the coils 42a and 42b of the first and second stators 56 and 57, and each of the lead wires 48a and 48b is inserted through an insertion hole (not shown) formed in the peripheral wall of the motor casing 21 (for example, the yoke housing 25) in the radial direction. Then, the lead wire 48a of the first coil 42a is connected to a connection portion 58a extending to the outer peripheral side of the peripheral wall of the motor casing 21 of the first drive circuit 58. Similarly, the lead wire 48b of the second coil 42b is connected to a connection portion 59a extending to the outer peripheral side of the peripheral wall of the motor casing 21 in the second drive circuit 59. Furthermore, the connection mode of the lead wires 48a and 48b can be also applied to the first embodiment.

In the first embodiment, as shown in FIG. 4, the circumferential end portion 32a of the magnet 32 is inclined with respect to the circumferential side surface 44a of each tooth 44 in the circumferential direction in a state in which the circumferential end portion 32a of the magnet 32 overlaps the circumferential side surface 44a of each tooth 44 as viewed in the axial direction. Thus, the skew effect, in which a change in magnetic field in the circumferential direction of the rotor 22 becomes gradual, decreases the cogging torque. The circumferential end portion 32a of the magnet 32 and the circumferential side surface 44a of each tooth 44 are inclined in the circumferential direction because the slot 45 between the teeth 44 in the circumferential direction has the same width in the radial direction in order to decrease a dead space inside the slot 45 by narrowing a gap between the coils 42 adjacent to each other in the circumferential direction.

Then, when large cogging torque is necessary as in the motor 12 of the variable valve timing device 11 of the first embodiment, it is desirable to employ a configuration of reducing the skew effect as shown in, for example, FIGS. 17 to 19.

Figure 17A:
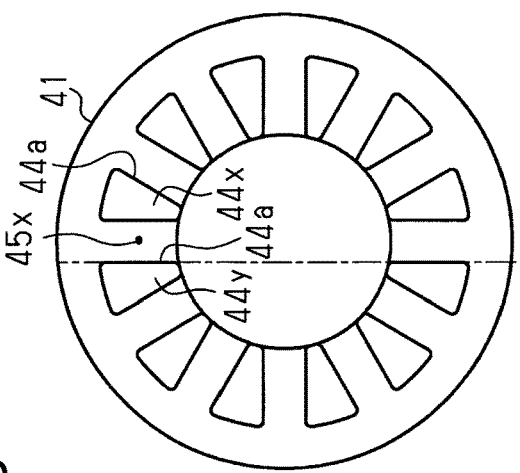
FIGS. 17A and 17B are plan views showing a relationship between a stator and a rotor of a modified example.
Figure 17B:
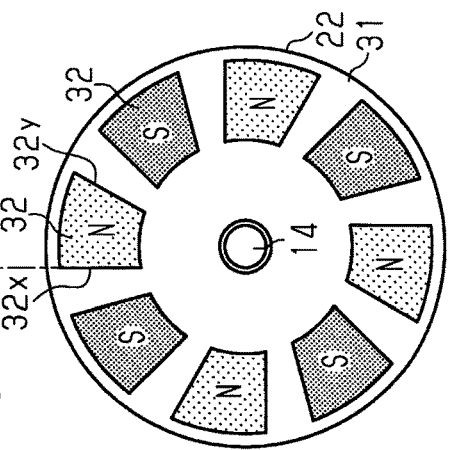

In the configuration shown in FIGS. 17A and 17B, the axial shape of the magnet 32 is the same as that of the slot 45. That is, both circumferential end portions 32a of the magnet 32 are linear to be parallel to each other as viewed in the axial direction, and the two circumferential end portions 32a entirely overlap the circumferential side surface 44a of each tooth 44 opposing in the circumferential direction. Accordingly, since a change in magnetic field in the circumferential direction of the rotor 22 with respect to the teeth 44 becomes steep and reduces the skew effect, decreases in cogging torque are limited.

Figure 18A:
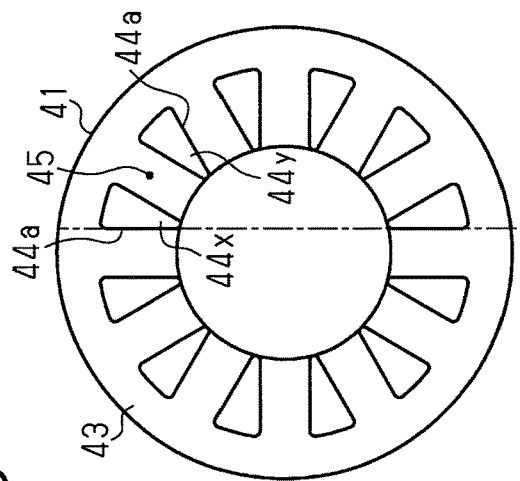
FIGS. 18A and 18B are plan views showing a relationship between a stator and a rotor of a modified example.
Figure 18B:
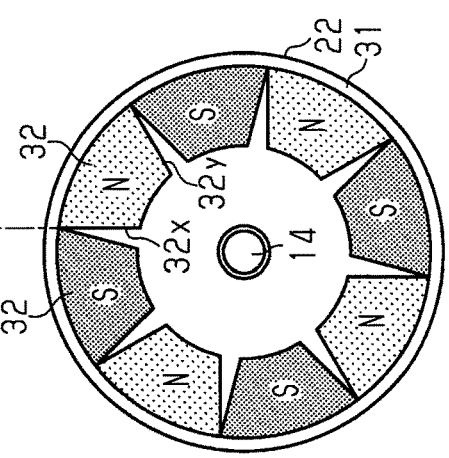

Further, in the configuration shown in FIGS. 18A and 18B, the shape of the magnet 32 corresponds to a shape of two adjacent teeth 44 in the circumferential direction combined with the slot 45 located in between as viewed in the axial direction. That is, one circumferential end portion 32x of the magnet 32 entirely overlaps the circumferential side surface 44a near the opposite teeth 44y of one tooth 44x of two adjacent teeth 44 (the teeth 44x and the teeth 44y) in the circumferential direction as viewed in the axial direction. Further, the other circumferential end portion 32y of the magnet 32 entirely overlaps the circumferential side surface 44a near the opposite teeth 44x of the other teeth 44y as viewed in the axial direction. Accordingly, since a change in magnetic field in the circumferential direction of the rotor 22 with respect to the teeth 44 becomes steep and limits the skew effect, decreases are limited in the cogging torque. Further, in the example of the same drawing, the magnet 32 is enlarged in area as compared with the example of FIG. 17. This limits decreases in the output.

Figure 19A:
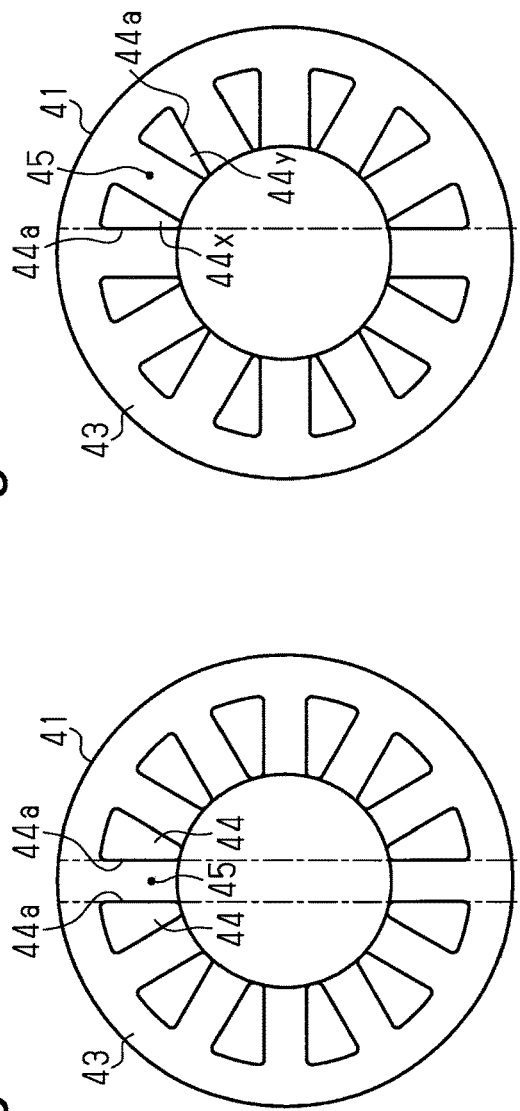
FIGS. 19A and 19B are plan views showing a relationship between a stator and a rotor of a modified example.
Figure 19B:
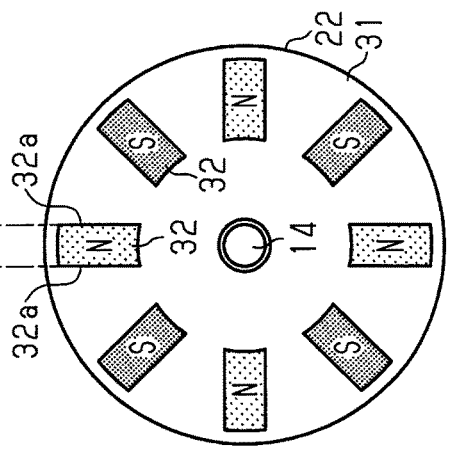

Further, in the configuration shown in FIGS. 19A and 19B, the shape of the magnet 32 corresponds to a shape in which one tooth 44x and the slot 45x adjacent to the teeth 44x are combined as viewed in the axial direction. That is, the of one circumferential end portion 32x of the magnet 32 entirely overlaps the circumferential side surface 44a near the slot 45x of the teeth 44y adjacent to the teeth 44x as viewed in the axial direction. Further, the of the other circumferential end portion 32y of the magnet 32 entirely overlaps the circumferential side surface 44a near the opposite slot 45x of the teeth 44x as viewed in the axial direction. Accordingly, since a change in magnetic field in the circumferential direction of the rotor 22 with respect to the teeth 44 becomes steep so that the skew effect is reduced, it is possible to limit decreases in the cogging torque. Further, in the example of the same drawing, since it is possible to enlarge the area of the magnet 32 as compared with the example of FIG. 17, it is possible to limit decreases in the output.

Figure 20:
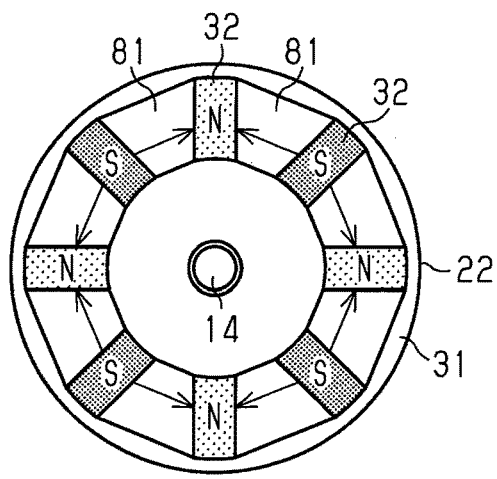
FIG. 20 is a plan view of a rotor of a modified example.

Furthermore, in the above-described example of FIG. 17, as shown in FIG. 20, an auxiliary magnet 81 which is magnetized in the circumferential direction may be provided between the magnets 32 in the circumferential direction. Furthermore, the auxiliary magnet 81 is magnetized in the circumferential direction so that the magnetic pole of the circumferential end portion has the same polarity as that of the adjacent magnet 32.

Figure 21:
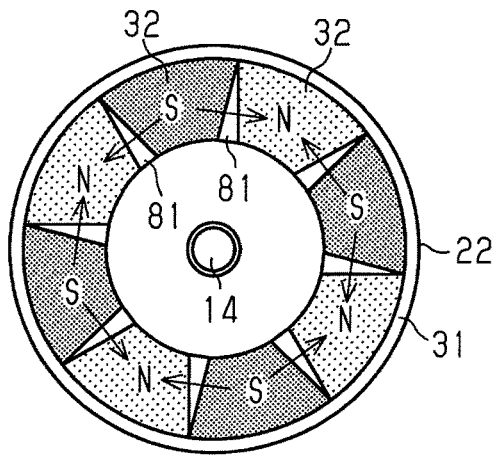
FIG. 21 is a plan view of a rotor of a modified example.

Further, also in the above-described example of FIG. 18, as shown in FIG. 21, the auxiliary magnet 81 which is magnetized in the circumferential direction may be provided between the magnets 32 in the circumferential direction.

Figure 22:
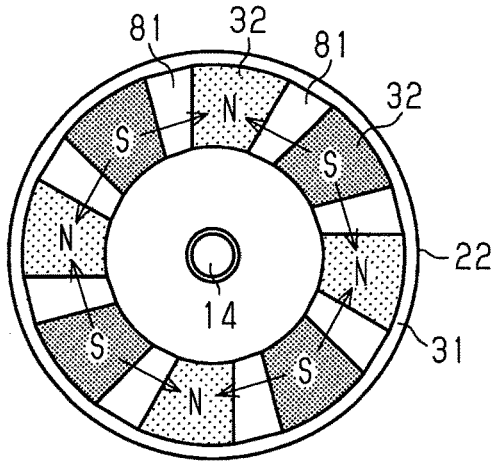
FIG. 22 is a plan view of a rotor of a modified example.

Further, also in the above-described example of FIG. 19, as shown in FIG. 22, the auxiliary magnet 81 which is magnetized in the circumferential direction may be provided between the magnets 32 in the circumferential direction.

According to the above-described configuration of FIGS. 20 to 22, it is possible to compensate for the output with the magnetic force of the auxiliary magnet 81, and decreases in the output are limited by adjusting the end portion shape of the magnet 32 in the circumferential direction.

In the first embodiment, the stator 23 is fixed to the bottom portion 25a of the yoke housing 25 and the rotor 22 is arranged between the stator 23 and the end frame 26 in the axial direction. However, the invention is not limited thereto. For example, the stator 23 may be fixed to the inner surface of the end frame 26 and the rotor 22 may be arranged between the stator 23 and the bottom portion 25a of the yoke housing 25 in the axial direction.

In the first embodiment, one magnet 32 is provided with the pair of grooves 35. However, the invention is not limited to such a structure. That is, only one of the two grooves 35 may be provided.

In the first embodiment, the rotor 22 includes the magnets 32 divided according to each magnetic pole. However, the invention is not limited to such a structure. For example, one annular magnet in which N and S poles are alternately arranged in the circumferential direction may be provided.

In the first and second embodiments, the groove cogging torques Tb and Td may be adjusted by adjusting at least one of the circumferential width, the axial depth, and the radial length of the grooves 35 and 64. Furthermore, the cogging torque increases when the circumferential width of each of the grooves 35 and 64 increases and the cogging torque decreases when the circumferential width of each of the grooves 35 and 64 decreases. Further, the cogging torque increases when the axial depth of each of the grooves 35 and 64 increases and the cogging torque decreases when the axial depth of each of the grooves 35 and 64 decreases. Further, the cogging torque increases when the radial length of each of the grooves 35 and 64 increases and the cogging torque decreases when the radial length of each of the grooves 35 and 64 decreases.

In the first and second embodiments, the grooves 35 and 64 are provided in the rotors 22 and 55. However, the invention is not limited to such a structure. For example, the groove may be provided in the stators 23, 56, and 57 (specifically, a surface opposing the stator in the teeth 44 in the axial direction).

In addition to the powder magnetic core, for example, the stator core 41 may be manufactured by stacking electromagnetic steel plates or combining the stacked electromagnetic steel plates with the powder magnetic core.

In the first and second embodiments, the drive circuits 24, 58, and 59 are provided at the outer side of the motor casing 21. However, the invention is not limited to such a structure. For example, the drive circuits 24, 58, and 59 may be provided inside the motor casing 21.

In the first and second embodiments, the end frame 26 forms the output side of the motor casing 21. However, the invention is not limited to such a structure. For example, the end frame 26 may form a side opposite to the output side of the motor casing 21.

The number of poles of the rotors 22 and 55 and the number of slots of the stators 23, 56, and 57 are not limited to the number of slots of the first and second embodiments and may be appropriately changed. When it is desirable to increase the cogging torque of the motor (for example, in the case of the motor of the coolant circulation device of the internal combustion engine or the variable valve timing device), it is desirable to set a ratio between the number of poles of the rotor and the number of slots of the stator to 8:12. Further, when it is desirable to decrease the cogging torque (when a function of maintaining the position of the rotor in a non-energization state is not necessary) as in the motor used in the electric power steering device or the electric brake device, it is desirable to set a ratio between the number of poles of the rotor and the number of slots of the stator to 10:12 or 14:12.

The motor 12 of the first embodiment is formed of a single gap type in which the stator 23 is arranged only at one side of the rotor 22 in the axial direction. However, the invention is not limited to such a structure. For example, the motor may be formed of a double gap type as in the second embodiment.

The motor 54 of the second embodiment is formed of a double gap type in which the first and second stators 56 and 57 are located at two sides of the rotor 55 in the axial direction. However, the invention is not limited to such a structure. For example, the motor may be formed of a single gap type as in the first embodiment.

In the first and second embodiments, the invention is applied to the brushless motor, but for example, the invention may be applied to a DC motor.

In the second embodiment, the invention is applied to the column assist type electric power steering device 50, but the invention may be also applied to, for example, a rack assist type or pinion assist type electric power steering device.

Further, the variable valve timing device is exemplified as the in-vehicle device in the first embodiment and the electric power steering device is exemplified as the in-vehicle device in the second embodiment. However, the invention may be applied to, for example, an auxiliary device of a vehicle such as a power window device and a wiper device. Further, as the in-vehicle device, the invention is not limited to the auxiliary device. For example, the invention may be applied to a main device that generates a traveling driving force of a vehicle in the in-vehicle device. Further, for example, the invention may be applied to a variable compression ratio device 90 of the internal combustion engine 10 (refer to FIG. 1). The variable compression ratio device 90 which is the in-vehicle device changes the compression ratio of the internal combustion engine 10 by changing, for example, a top dead center position of the piston 16 based on the driving of the motor. As the motor of the variable compression ratio device 90, the motor 12 of the first embodiment or the motor 54 of the second embodiment is used. Then, it is also desirable to attach the motor of the variable compression ratio device 90 similarly to the attachment mode of the motor 12 of the first embodiment. That is, it is desirable to attach the motor so that the axial direction of the motor be perpendicular to the vertical direction X, the reciprocation direction of the piston 16, and the front-rear direction of the vehicle.

Figure 23:
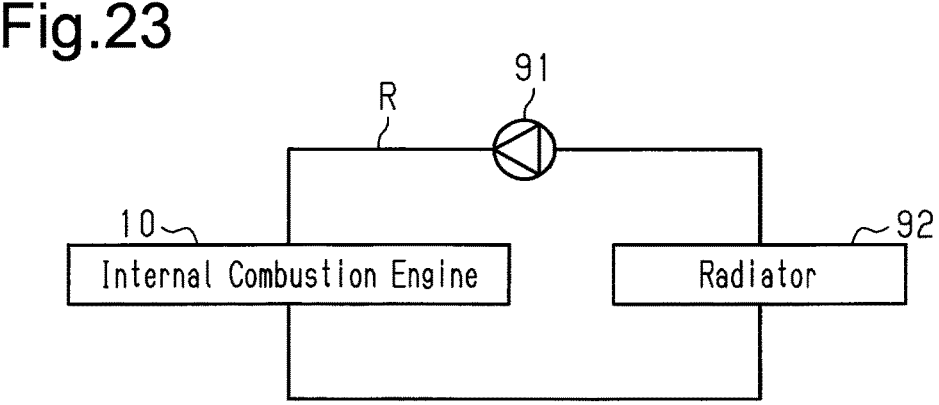
FIG. 23 is a schematic diagram showing a coolant circulation device.

Further, for example, the invention may be applied to a coolant circulation device 91 (a water pump) of the internal combustion engine 10 shown in FIG. 23. The coolant circulation device 91 which is the in-vehicle device is a device which circulates coolant in a circulation path R between the internal combustion engine 10 and a radiator 92 and is operated by driving the motor. As the motor of the coolant circulation device 91, a motor having the same configuration as that of the motor 12 of the first embodiment or the motor 54 of the second embodiment is used. Then, it is also desirable to attach the motor of the coolant circulation device 91 similarly to the motor 12 of the first embodiment. That is, it is desirable to attach the motor so that the axial direction of the motor be perpendicular to the vertical direction X, the reciprocation direction of the piston 16, and the front-rear direction of the vehicle. Furthermore, the coolant circulation device 91 may be provided in a circulation path inside the internal combustion engine 10 or a passage between the internal combustion engine 10 and the radiator 92.

Figure 24:
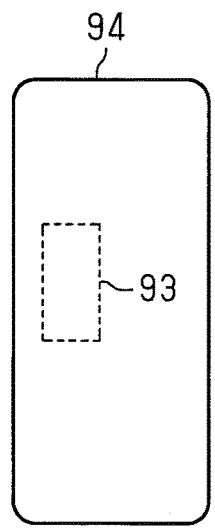
FIG. 24 is a schematic diagram showing an electric brake device.

Further, for example, the invention may be applied to an electric brake device 93 that generates a braking force for a vehicle wheel 94 shown in FIG. 24. The electric brake device 93 which is the in-vehicle device is used to generate a braking force for the vehicle wheel 94 in such a manner that a friction member is pressed against a rotation body rotating along with the vehicle wheel 94 by the driving of the motor. Furthermore, the electric brake device 93 may be of a disc type or a drum type. Further, the electric brake device 93 may be any one of a foot brake, a parking brake, and a brake having these functions of the vehicle. As the motor of the electric brake device 93, a motor having the same configuration as that of the motor 12 of the first embodiment or the motor 54 of the second embodiment is used. Then, it is also desirable to attach the motor of the electric brake device 93 similarly to the motor 54 of the second embodiment. That is, it is desirable to attach the motor so that the axial direction of the motor be perpendicular to the vertical direction X and the front-rear direction of the vehicle.

Figure 25:
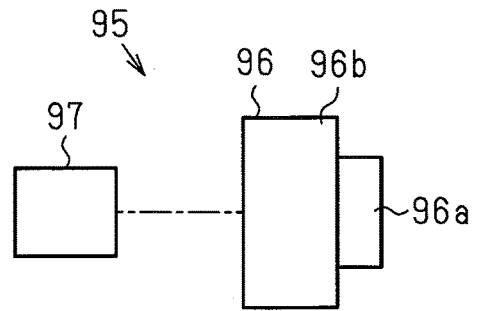
FIG. 25 is a schematic diagram showing an electric brake device.

Furthermore, as an applicable electric brake device, another electric brake device may be used in addition to an electro-mechanical brake (EMB) shown in FIG. 24. For example, the invention may be applied to an electro-hydraulic brake (EHB) device 95 shown in FIG. 25. The electro-hydraulic brake device 95, which is the in-vehicle device, includes a hydraulic actuator 96 including a motor 96*a* and a pump unit 96b and generates a braking force for the vehicle wheel by operating a brake mechanism 97 using a hydraulic pressure (a liquid pressure) generated based on the driving of the hydraulic actuator 96. Also in the motor 96a, a motor having the same configuration as that of the motor 12 of the first embodiment or the motor 54 of the second embodiment is used. Then, it is desirable to attach the motor similarly to the motor 54 of the second embodiment. That is, it is desirable to attach the motor so that the axial direction of the motor be perpendicular to the vertical direction X and the front-rear direction of the vehicle.

Figure 26:
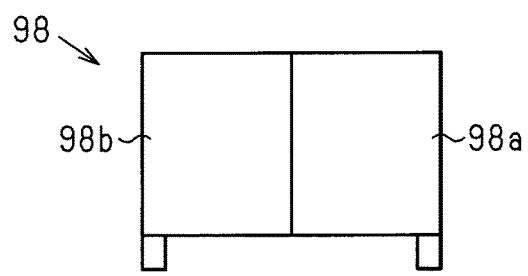
FIG. 26 is a schematic diagram showing an electric compressor.

Further, for example, the invention may be applied to an electric compressor 98 used in a vehicle air conditioner shown in FIG. 26. The electric compressor 98 which is the in-vehicle device includes a motor 98a and a scroll compressor 98b operated by the driving of the motor 98a. Also in the motor 98a, a motor having the same configuration as that of the motor 12 of the first embodiment or the motor 54 of the second embodiment is used. Then, it is desirable to attach the motor similarly to the motor 54 of the second embodiment. That is, it is desirable to attach the motor so that the axial direction of the motor be perpendicular to the vertical direction X and the front-rear direction of the vehicle.

Figure 27B:
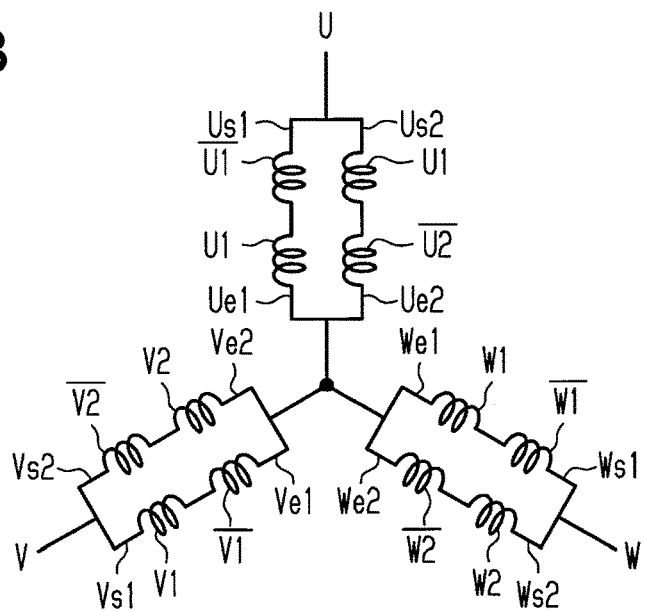
Figure 29:
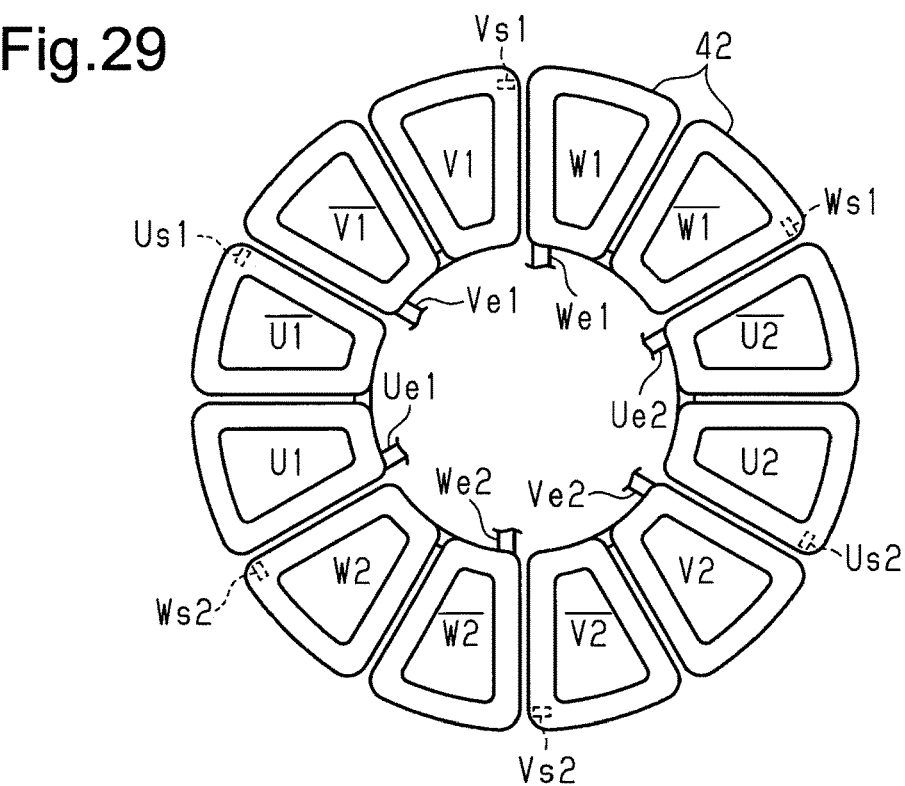
FIG. 29 is a plan view of each coil of a modified example.

The winding mode of the coil 42 of the first embodiment may be changed as shown in FIGS. 27B and 29. In the winding mode of the coil 42 shown in FIG. 29, U1, a bar U1, a bar V1, V1, W1, a bar W1, a bar U2, U2, V2, a bar V2, a bar W2, and W2 are set in order in the clockwise direction. Furthermore, a U-phase coil bar U1, a bar U2, a V-phase coil bar V1, a bar V2, a W-phase coil bar W1, and a bar W2 are wound reversely with respect to U-phase coils U1 and U2, V-phase coils V1 and V2, and W-phase coils W1 and W2 wound normally.

The U-phase coil U1 and the bar U1 are arranged adjacently in the circumferential direction (that is, these members are wound around the teeth 44 adjacent each other in the circumferential direction). Similarly, the U-phase coil U2 and the bar U2 are arranged adjacently in the circumferential direction. Further, the U-phase coil U1 and the bar U2 are located at 180-degree opposing positions and the U-phase coil U2 and the bar U1 are located at 180-degree opposing positions. The same applies to the other phases (the V and W phases).

The U-phase coil U1 and the bar U1 are continuously wound from a winding start line Us1 to a winding end line Ue1. That is, the U-phase coil U1 and the U-phase coil bar U1 form a series circuit. Similarly, the U-phase coil U2 and the bar U2 are continuously wound from a winding start line Us2 to a winding end line Ue2 and form a series circuit. Then, the series circuit of the U-phase coil U1 and the bar U1 and the series circuit of the U-phase coil U2 and the bar U2 are connected in parallel to each other (refer to FIG. 27B).

The U-phase winding mode is also the same as the other phases (the V and W phases). That is, a pair of the V-phase coil V1 and the bar V1 and a pair of the V-phase coil V2 and the bar V2 are continuously wound from winding start lines Vs1 and Vs2 to winding end lines Ve1 and Ve2 and form a series circuit. Then, the series circuit of the V-phase coil V1 and the bar V1 and the series circuit of the V-phase coil V2 and the bar V2 are connected in parallel to each other (refer to FIG. 27B).

Further, a pair of the W-phase coil W1 and the bar W1 and a pair of the W-phase coil W2 and the bar W2 are continuously wound from winding start lines Ws1 and Ws2 to winding end lines We1 and We2 and form a series circuit. Then, the series circuit of the W-phase coil W1 and the bar W1 and the series circuit of the W-phase coil W2 and the bar W2 are connected in parallel to each other (refer to FIG. 27B).

As shown in FIG. 29, the winding start lines Us1, Us2, Vs1, Vs2, Ws1, and Ws2 are respectively drawn out in the axial direction from the coils 42 arranged at equal intervals in the circumferential direction (in this example, every other coil 42). Then, the winding start lines Us1, Us2, Vs1, Vs2, Ws1, and Ws2 are arranged at equal intervals (in this example, intervals of 60°) in the circumferential direction. Further, the radial positions (the dimensions from the axis L of the rotation shaft 14) of the winding start lines Us1, Us2, Vs1, Vs2, Ws1, and Ws2 are set to the same.

Then, the winding start lines Us1, Us2, Vs1, Vs2, Ws1, and Ws2 respectively pass through the corresponding notches 46, extend out of the rear surface of the base portion 43 (on the opposite side to the teeth 44), and are connected to the drive circuit 24. Further, the winding end lines Ue1, Ue2, Ve1, Ve2, We1, and We2 are electrically connected.

Furthermore, the above-described winding mode is an example, and a winding mode in which a winding start line and a winding end line are reversed may be used. Further, in the case of the winding mode, the number of poles of the rotor 22 is desirably ten or fourteen.

According to the above-described configuration, a plurality of lead wires (the winding start lines Us1, Us2, Vs1, Vs2, Ws1, and Ws2) of the stator 23 are arranged at equal intervals in the circumferential direction. For this reason, it is possible to obtain a satisfactory structural balance (weight balance) about the axis L. As a result, it is possible to appropriately reduce vibration of the motor 12 caused by resonance or the like. Accordingly, it is possible to more appropriately limit changes in the air gap between the rotor 22 and the stator 23 and to further improve the reliability of the in-vehicle device.

In the first stator 56 of the second embodiment, the first lead wire 48a is provided in the plurality of (six) coils 42a arranged adjacently in the circumferential direction. Similarly, in the second stator 57, the second lead wire 48b is provided in the plurality of (six) coils 42b arranged adjacently in the circumferential direction. However, the invention is not limited to such a structure. However, this configuration may be appropriately modified.

Figure 31:
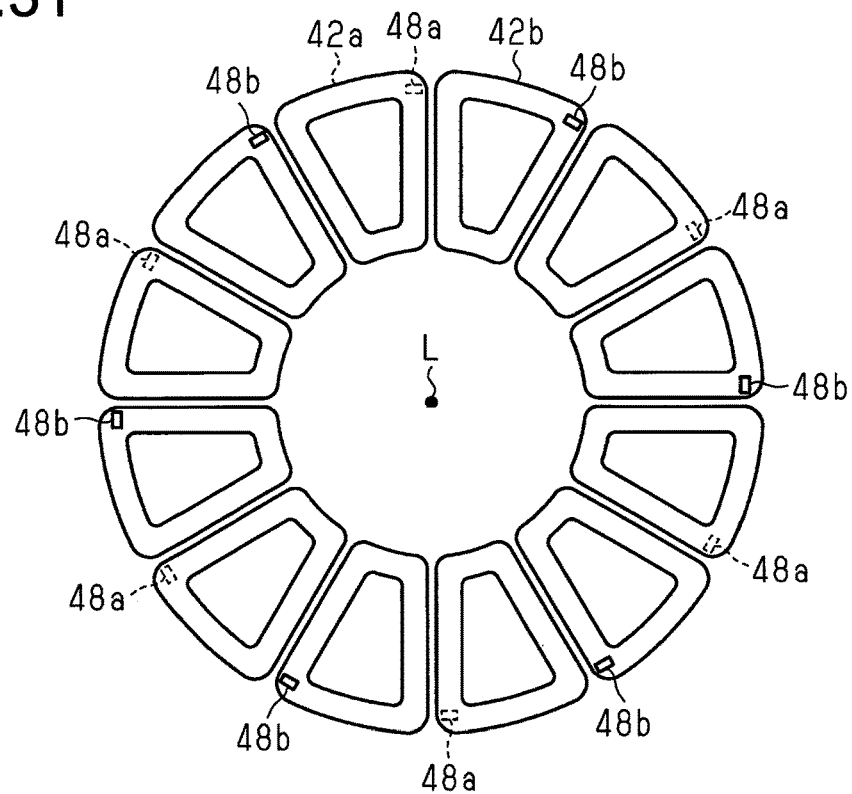
FIG. 31 is a schematic diagram illustrating a position of a lead wire of a coil of the modified example.

For example, in the configuration shown in FIG. 31, in the first stator 56, the first lead wire 48a is provided in every other coil 42a in the circumferential direction and six first lead wires 48a are arranged at equal intervals (intervals of 60°) in the circumferential direction. Further, also in the second stator 57, the second lead wire 48b is provided in every other coil 42b in the circumferential direction and six second lead wires 48b are arranged at equal intervals (intervals of 60°) in the circumferential direction. Then, the first lead wire 48a and the second lead wire 48b are alternately arranged at equal intervals in the circumferential direction as viewed from the direction of the axis L. Furthermore, the configuration of the first and second lead wires 48a and 48b in the first and second stators 56 and 57 shown in the same drawing can be obtained by applying, for example, the winding mode shown in FIG. 29.

Also with the configuration shown in FIG. 31, similarly to the second embodiment, all lead wires 48a and 48b (at least root portions thereof) of the first and second stators 56 and 57 are arranged at equal intervals in the circumferential direction. For this reason, it is possible to obtain a satisfactory structural balance (weight balance) about the axis L. As a result, it is possible to appropriately reduce the vibration of the motor 54 caused by resonance or the like.

Further, in the configuration, the first lead wire 48*a* and the second lead wire 48*b* are alternately arranged in the circumferential direction as viewed from the direction of the axis L. That is, the first lead wire 48*a* and the second lead wire 48*b* do not overlap each other in the axial direction. For this reason, the structural balance (weight balance) of the motor 54 becomes more satisfactory as compared with a configuration in which the first lead wire 48*a* and the second lead wire 48*b* overlap each other in the axial direction. As a result, it is possible to more appropriately reduce the vibration of the motor caused by resonance or the like.

Furthermore, the number of lead wires 48*a* and 48*b* of the first and second stators 56 and 57 of the second embodiment is an example and is appropriately changed according to the winding mode of the coils 42*a* and 42*b*.

The first and second embodiments and the modified examples may be appropriately combined.

Next, technical spirit that can be understood from the present embodiments and the modified examples described above will be additionally described below.

(A) An axial gap type motor in which a magnetic pole portion of a rotor opposes teeth of a stator in the axial direction, the motor including:
the rotor including an axial end surface provided with the magnetic pole portion; and
the stator including a stator core, which includes a plate-shaped base portion and a plurality of teeth, and a plurality of coils, wherein the plurality of teeth project from one surface of the base portion in the axial direction and are arranged next to one another in the circumferential direction, and the coils are respectively wound around the teeth,
wherein one circumferential end portion of the magnetic pole portion of the rotor entirely overlaps one circumferential end portion of the teeth as viewed in the axial direction.

According to this configuration, since a change in magnetic field in the circumferential direction of the rotor with respect to the teeth becomes steep so that the skew effect is limited, it is possible to limit decreases in the cogging torque.

(B) A vehicle motor attachment structure, wherein
the first lead wire is one of a plurality of first lead wires,
the second lead wire is one of a plurality of second lead wires,
the first lead wire and the second lead wire are provided in the same number, and
each of the first lead wires and each of the second lead wires are located at 180-degree opposing positions about the rotation axis of the motor.

According to this configuration, it is possible to obtain a more satisfactory structural balance (weight balance) about the rotation axis of the motor. As a result, it is possible to more appropriately reduce vibration of the motor caused by resonance or the like.

The invention claimed is:

1. A vehicle motor attachment structure attached to an in-vehicle device installed in a vehicle, the attachment structure comprising:
an axial gap type motor including a rotor and a stator opposing each other in an axial direction,
wherein:
the motor is attached to the in-vehicle device so that the axial direction is perpendicular to a vertical direction, the vertical direction being defined by a direction that is perpendicular to both a front-rear direction of the vehicle and a width direction of the vehicle,
the axial direction of the motor is perpendicular to the front-rear direction of the vehicle, and
the in-vehicle device is any one of a variable valve timing device of an internal combustion engine, a variable compression ratio device of the internal combustion engine, a coolant circulation device of the internal combustion engine, an electric brake device, and an electric compressor.

2. The vehicle motor attachment structure according to claim 1, wherein the axial direction of the motor is perpendicular to a reciprocation direction of a piston of the internal combustion engine.

3. The vehicle motor attachment structure according to claim 1, wherein
the rotor and the stator include a plurality of opposing surfaces opposing each other, and
at least one of the plurality of opposing surfaces includes a groove extending in a radial direction to adjust cogging torque generated in the motor.

4. The vehicle motor attachment structure according to claim 1, wherein:
the rotor includes a plurality of magnets, which are arranged at intervals in a circumferential direction and opposed to the stator in the axial direction, and an inter-magnet portion, which is located between each adjacent magnet of the plurality of magnets;
the plurality of magnets each include one axial end surface and a plurality of magnetic poles formed on the one axial end surface and arranged in the circumferential direction; and
the plurality of magnets are each configured so that magnetic poles of a same polarity of each adjacent magnet of the plurality of magnets in the circumferential direction are located adjacent to each other in the circumferential direction sandwiching the inter-magnet portion.

5. The vehicle motor attachment structure according to claim 1, wherein
the stator includes a stator core, which has a ring-shaped base portion and a plurality of teeth projecting from one surface of the base portion in the axial direction, and a coil, which is wound around each of the plurality of teeth;
the plurality of teeth are arranged in a circumferential direction;
the base portion includes an outer circumference located outward from outer ends of the plurality of teeth in a radial direction; and
the outer circumference of the base portion is provided with a notch recessed inward in the radial direction.

6. The vehicle motor attachment structure according to claim 5, wherein a lead wire extending from the coil is inserted through the notch.

7. The vehicle motor attachment structure according to claim 1, wherein
the stator includes a plurality of coils, and
a plurality of lead wires extending from the plurality of coils are arranged at equal intervals in a circumferential direction.

8. The vehicle motor attachment structure according to claim 1, wherein:
the stator is one of a first stator and a second stator,
the first stator and the second stator are respectively provided at two sides of the rotor in the axial direction, the motor includes a first drive circuit and a second drive circuit, the first drive circuit is connected to a coil of the first stator and controls a drive current supplied to the coil, and the second drive circuit is connected to a coil of the second stator and controls a drive current supplied to the coil.

9. The vehicle motor attachment structure according to claim 8, wherein the coil of the first stator includes a first lead wire, the coil of the second stator includes a second lead wire, and the first lead wire and the second lead wire are located at 180-degree opposing positions about a rotation axis of the motor.

10. A brushless motor applied to the vehicle motor attachment structure according to claim 1, the brushless motor being the axial gap type motor, the brushless motor comprising:

the rotor including one axial end surface having a first magnetic pole portion and another axial end surface having a second magnetic pole portion;

the stator including a first stator and a second stator, the first stator including a first coil opposing the first magnetic pole portion in the axial direction;

the second stator including a second coil opposing the second magnetic pole portion in the axial direction;

a first drive circuit connected to the first coil to control a drive current supplied to the first coil; and a second drive circuit connected to the second coil to control a drive current supplied to the second coil.

11. The brushless motor according to claim 10, wherein the first and second stators each include a stator core including a ring-shaped base portion and a plurality of teeth, which project from one surface of the base portion in the axial direction and arranged in a circumferential direction, the first coil is wound around each of the plurality of teeth of the first stator, the second coil is wound around each of the plurality of teeth of the second stator, and at least one of an inner circumference of the base portion of the first stator, an outer circumference of the base portion of the first stator, an inner circumference of the base portion of the second stator, and an outer circumference of the base portion of the second stator is provided with a notch recessed in a radial direction.

12. The brushless motor according to claim 11, wherein a lead wire extending from the first coil or the second coil is inserted through the notch.

13. The brushless motor according to claim 10, wherein the rotor includes opposing surfaces opposing the first and second stators, the first and second stators each include opposing surfaces opposing the rotor, and at least one of the opposing surfaces of the rotor and the opposing surfaces of the first and second stators includes a groove extending in a radial direction to adjust cogging torque generated in the brushless motor.

14. The brushless motor according to claim 10, wherein:

at least one of the first and second magnetic pole portions of the rotor includes a plurality of magnets, which are arranged at intervals in a circumferential direction, and an inter-magnet portion, which is located between each adjacent magnet of the plurality of magnets;

the plurality of magnets each include one axial end surface and a plurality of magnetic poles formed on the one axial end surface and arranged in the circumferential direction; and the plurality of magnets are each configured so that the magnetic poles of a same polarity of each adjacent magnet of the plurality of magnets in the circumferential direction are located adjacent to each other in the circumferential direction sandwiching the inter-magnet portion.

* * * * *